(12) United States Patent
Ko

(10) Patent No.: US 9,124,865 B2
(45) Date of Patent: Sep. 1, 2015

(54) DISPLAY APPARATUS AND METHOD OF ADJUSTING 3D IMAGE THEREIN

(75) Inventor: Dongseuck Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 13/565,468

(22) Filed: Aug. 2, 2012

(65) Prior Publication Data

US 2013/0155052 A1 Jun. 20, 2013

(30) Foreign Application Priority Data

Dec. 15, 2011 (KR) .......................... 10-2011-0135708

(51) Int. Cl.
| | |
|---|---|
| G06T 15/00 | (2011.01) |
| G06T 17/00 | (2006.01) |
| H04N 13/00 | (2006.01) |
| H04N 13/04 | (2006.01) |

(52) U.S. Cl.
CPC ....... *H04N 13/0022* (2013.01); *H04N 13/0018* (2013.01); *H04N 13/0404* (2013.01); *H04N 13/0409* (2013.01); *G06F 2203/04102* (2013.01)

(58) Field of Classification Search
CPC combination set(s) only.
See application file for complete search history.

(56) References Cited

U.S. PATENT DOCUMENTS

2011/0018968 A1* 1/2011 Shikata et al. ................... 348/47
2013/0093753 A1* 4/2013 Rissa et al. ..................... 345/419

FOREIGN PATENT DOCUMENTS

KR 10-2010-0023256 A 3/2010

* cited by examiner

*Primary Examiner* — Leon T Cain, II
(74) *Attorney, Agent, or Firm* — Birch, Stewart, Kolasch & Birch, LLP

(57) ABSTRACT

A display apparatus including a flexible display unit configured to discriminately output a left eye image and a right eye image; a transparent sensor unit disposed on one face of the flexible display unit and configured to be flexed together with the flexible display unit; and a control unit configured to receive a signal from the transparent sensor unit corresponding to an electrical variation generated in accordance with a flex of the flexible display unit, and to adjust a 3D depth value of a flexed region of the flexible display.

18 Claims, 18 Drawing Sheets

DISPLAY APPARATUS AND METHOD OF ADJUSTING 3D IMAGE THEREIN

Pursuant to 35 U.S.C. §119(a), this application claims the benefit of earlier filing date and right of priority to Korean Application No. 10-2011-0135708, filed on Dec. 15, 2011, the contents of which are hereby incorporated by reference herein in their entirety.

BACKGROUND OF THE INVENTION

1. Field of the Invention

The present invention relates to a display apparatus and method of adjusting a 3D image therein, and more particularly, a display apparatus and method for adjusting a 3D stereoscopic image. Although the present invention is suitable for a wide scope of applications, it is particularly suitable for if a stereoscopic shape of a flexible display unit is changed by an external physical force, adjusting a 3D stereoscopic image in accordance with the changed stereoscopic shape of the flexible display unit.

2. Discussion of the Related Art

A 3-dimensional (hereinafter abbreviated 3D) stereoscopic image technology indicates a technology of representing a depth of an object, a spatial shape information and the like in an image as if the object is actually seen via human eyes unlike the conventional 2D planar image.

The 3D stereoscopic image technology is applicable to various fields such as information communications, medical industry, educational training, military technology, animations, virtual reality, CAD, industrial technologies and the like. Further, the 3D stereoscopic image technology is the basic core technology of next generation 3D stereoscopic multimedia information communications required in common for the various fields.

Generally, a 3D effect perceived by a human is generated by a thickness variation of a crystalline lens depending on a position of an object to be observed, an angle difference between both eyes and a target, position and shape differences between a target seen via a left eye and a target seen via a right eye, a disparity generated from a motion of a target, an effect attributed to psychology and memory and the like.

In particular, binocular disparity is generated as both eyes of a user are situated by being spaced apart from each other in a space about 6 cm~7 cm in-between and may become a major factor of the 3D effect. A target is seen with an angle difference attributed to the binocular disparity. In particular, when a target is seen with an angle difference attributed to the binocular disparity, images entering both eyes are different from each other due to the angle difference. After the two images have been delivered to the brain via retinas, the brain merges the two information precisely to sense an original 3D stereoscopic image.

The 3D stereoscopic image technology is applied to such a device as a mobile phone, a TV, a monitor and the like by being combined with one of a liquid crystal display (LCD), a thin film transistor liquid crystal display (TFT LCD), an organic light emitting diode (OLED) display, a flexible display and the like. However, the stereoscopic image technology is still limited in nature.

SUMMARY OF THE INVENTION

Accordingly, the present invention is directed to a display apparatus and method of adjusting a 3D image therein that substantially obviate one or more problems due to limitations and disadvantages of the related art.

An object of the present invention is to provide a display apparatus and method of adjusting a 3D image therein, by which an original 3D stereoscopic image is maintained despite that a flexible display is flexed.

Another object of the present invention is to provide a display apparatus and method of adjusting a 3D image therein, by which a 3D effect is enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display apparatus according to the present invention may include a flexible display unit configured to discriminately output a left eye image and a right eye image, the flexible display unit configured flexible by an external physical force, a transparent sensor unit provided to one face of the flexible display unit to be flexible together with the flexible display unit, and a control unit configured to adjust a 3D depth value of a flexed region of the flexible display unit by interpreting a 3D shape of the flexible display unit based on an electrical variation generated from the transparent sensor unit in accordance with a flex of the flexible display unit.

Preferably, the transparent sensor unit may include a transparent substrate, a plurality of sensor electrodes formed on the transparent substrate and an electrode line connected to one or both ends of each of a plurality of the sensor electrodes and the control unit may interpret the 3D shape of the flexible display unit based on an inner distance variation of each of the sensor electrodes in accordance with the flex of the flexible display unit.

More preferably, when a user comes in contact with the transparent sensor unit, the control unit may measure a user's contact point via a capacitance variation of the sensor electrode.

Preferably, the control unit may control the flexible display unit by decreasing the 3D depth value of a forward convexly flexed region of the flexible display unit and increasing the 3D depth value of a backward concavely flexed region of the flexible display unit.

Preferably, the flexible display unit may be subdivided into a plurality of unit regions and the control unit may control the flexible display unit to individually adjust the 3D depth value of each of a plurality of the unit regions.

More preferably, the control unit may control the flexible display unit in a manner that the 3D depth value of a $1^{st}$ region flexed forward more than a preset region of the flexible display unit is greater than the 3D depth value of the preset region and that the 3D depth value of a $2^{nd}$ region adjacent to the preset region and flexed backward more than the preset region is smaller than the 3D depth value of the preset region.

In this instance, the $1^{st}$ region may be subdivided into a plurality of $1^{st}$ unit regions, the $2^{nd}$ region may be subdivided into a plurality of $2^{nd}$ unit regions, the control unit may control the flexible display unit in a manner that the 3D depth value of each of a plurality of the 1 unit regions is increasingly raised in proportion to an increasing distance from the preset region that the 3D depth value of each of a plurality of the $2^{nd}$ unit regions is decreasingly lowered in proportion to the increasing distance from the preset region.

Preferably, the flexible display unit may include a plurality of unit pixels each of which includes a left eye pixel and a right eye pixel.

More preferably, the control unit may control the flexible display unit to individually adjust a color sense and brightness of the left eye pixel and the color sense and brightness of the right eye pixel in accordance with a 3D shape of the flexible display unit.

In this instance, if a $3^{rd}$ region adjacent to a left side of a preset region is flexed forward with reference to the preset region located in a very front of a user, the control unit may control the brightness of the right eye pixel of the $3^{rd}$ region to be greater than the brightness of the left eye pixel. Further, if the left region is flexed backward, the control unit may control the brightness of the right eye pixel of the left region to be smaller than the brightness of the left eye pixel.

If a $4^{th}$ region adjacent to a right side of a preset region is flexed forward with reference to the preset region located in a very front of a user, the control unit may control the brightness of the left eye pixel of the $4^{th}$ region to be greater than the brightness of the right eye pixel. Further, if the right region is flexed backward, the control unit may control the brightness of the left eye pixel of the right region to be smaller than the brightness of the right eye pixel.

If a $3^{rd}$ region adjacent to a left side of a preset region is flexed forward with reference to the preset region located in a very front of a user, the control unit may control the color sense of the right eye pixel of the $3^{rd}$ region to be greater than the color sense of the left eye pixel. Further, if the left region is flexed backward, the control unit may control the color sense of the right eye pixel of the left region to be smaller than the color sense of the left eye pixel.

If a $4^{th}$ region adjacent to a right side of a preset region is flexed forward with reference to the preset region located in a very front of a user, the control unit may control the color sense of the left eye pixel of the $4^{th}$ region to be greater than the color sense of the right eye pixel. Further, if the right region is flexed backward, the control unit may control the color sense of the left eye pixel of the right region to be smaller than the color sense of the right eye pixel.

Preferably, the display apparatus may further include a parallax barrier provided between the flexible display unit and the transparent sensor unit. Further, the parallax barrier may include a plurality of cutoff parts configured to selectively cut off the left eye image or the right eye image output from the flexible display unit and a plurality of transmittive parts configured to selectively transmit the left eye image or the right eye image.

Preferably, the display apparatus may further include a lenticular lens provided between the flexible display unit and the transparent sensor unit, the lenticular lens configured to selectively refract the left eye image or the right eye image output from the flexible display unit by a different refraction index.

In another aspect of the present invention, a method of adjusting a 3D image in a display apparatus may include the steps of interpreting a 3D shape of a flexible display unit and adjusting a 3D depth value different in each of a plurality of regions by dividing the flexible display unit into a plurality of the regions based on the 3D shape of the flexible display unit.

Preferably, the step of interpreting the 3D shape of the flexible display unit may include the step of interpreting the 3D shape of the flexible display unit based on an inner distance variation of a sensor electrode of a transparent sensor unit in accordance with a flex of the flexible display unit.

Preferably, the step of adjusting the 3D depth value different in each of a plurality of the regions by dividing the flexible display unit into a plurality of the regions based on the 3D shape of the flexible display unit may be performed by decreasing the 3D depth value of a forward convexly flexed region of the flexible display unit and increasing the 3D depth value of a backward concavely flexed region of the flexible display unit.

Preferably, the step of adjusting the 3D depth value different in each of a plurality of the regions by dividing the flexible display unit into a plurality of the regions based on the 3D shape of the flexible display unit may be performed in a manner that the 3D depth value of a $1^{st}$ region flexed forward more than a preset region of the flexible display unit is greater than the 3D depth value of the preset region and that the 3D depth value of a $2^{nd}$ region adjacent to the preset region and flexed backward more than the preset region is smaller than the 3D depth value of the preset region.

Preferably, the step of adjusting the 3D depth value different in each of a plurality of the regions by dividing the flexible display unit into a plurality of the regions based on the 3D shape of the flexible display unit may be performed by subdividing the $1^{st}$ region into a plurality of $1^{st}$ unit regions, subdividing the $2^{nd}$ region into a plurality of $2^{nd}$ unit regions, controlling the 3D depth value of each of a plurality of the $1^{st}$ unit regions to be increasingly raised in proportion to an increasing distance from the preset region, and controlling the 3D depth value of each of a plurality of the $2^{nd}$ unit regions to be decreasingly lowered in proportion to the increasing distance from the preset region.

Accordingly, the present invention provides the following effects and/or advantages.

First of all, the present invention increases or decreases a 3D depth value of a region, in which a flexible display unit is flexed, by interpreting a 3D shape of the flexible display unit, thereby implementing the same 3D image of the flexible display unit in a planar state despite that the 3D shape of the flexible display unit is changed and preventing a 3D effect from being degraded.

Secondly, when a flexible display unit is concavely flexed to surround a user, the present invention sequentially increases a 3D depth value in a user-located direction by partitioning the flexible display unit into a plurality of regions.

Thirdly, the present invention individually adjusts a color sense and brightness of a left eye pixel and a color sense and brightness of a right eye pixel in a flexible display in accordance with a flexed direction of the flexible display, thereby enhancing a 3D effect of a display apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. Redundant descriptions of the same or similar parts shall be omitted. For clarity and convenience of the following description, a size and shape of each component may be exaggerated or reduced.

Meanwhile, although terminologies containing such ordinal numbers as a $1^{st}$, a $2^{nd}$ and the like may be usable to refer to various components, the components may be non-limited by those terminologies. Further, those terminologies shall be used to discriminate one component from other components only.

A display apparatus according to the present invention includes a flexible display unit configured to be flexible by an external physical force, a transparent sensor unit provided to one face of the flexible display unit to be flexed in one body of the flexible display unit, and a control unit controlling a 3D depth value of a region in which the flexible display unit is flexed. The present invention adjusts a 3D image in accordance with a changed 3D shape of a flexible display, thereby implementing various 3D effects while maintaining a 3D stereoscopic image on the 3D shape changed flexible display.

The present invention is more described in detail with reference to the accompanying drawings as follows.

Figure 1:
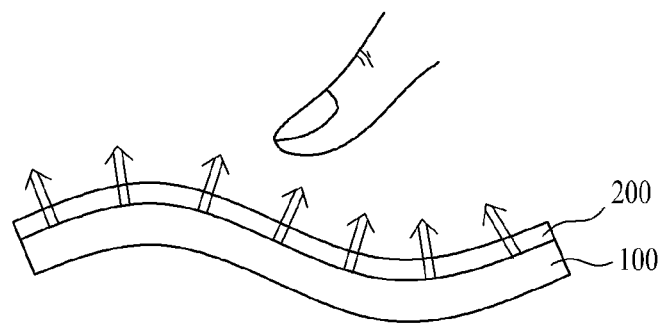
FIG. 1 is a cross=sectional diagram of a display apparatus according to one embodiment of the present invention.
Figure 2:
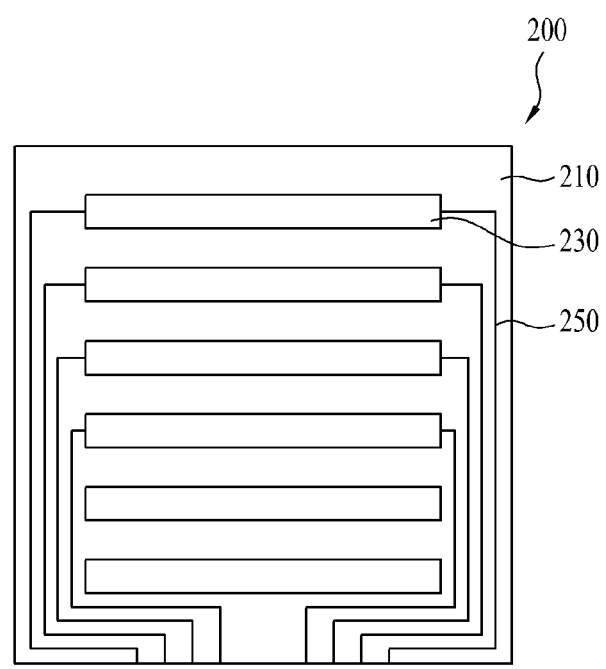
FIG. 2 is a layout of a transparent sensor unit according to one embodiment of the present invention.

FIG. 1 is a cross-sectional diagram of a display apparatus according to one embodiment of the present invention, and FIG. 2 is a layout of a transparent sensor unit according to one embodiment of the present invention. Referring to FIG. 1, the display apparatus includes a flexible display unit 100 that can be flexed by an external physical force, and a transparent sensor unit 200 is provided to one face of the flexible display unit 100.

In particular, the flexible display unit 100 corresponds to a display device that is light-weighted and unbreakable. The display unit 100 is fabricated on a thin and flexible substrate, which can be flexed, bent or rolled up like a paper, by maintaining display properties of a flat panel display. Further, the flexible display may be called a bendable display or the like. Moreover, the flexible display may be implemented using TFT LCD (thin film transistor liquid crystal display) technology, organic EL (OLED) technology, electrophoretic technology, LITI (laser induced thermal image) technology and the like.

Meanwhile, an e-paper (electronic-paper) may be used as a flexible display. The electronic paper is a display device having general features of ink and paper applied thereto and is abbreviated an e-paper. Unlike the traditional flat panel display having a backlight illumination applied to pixels, an e-paper uses a reflective light like a normal paper. Once an image and/or text is formed, the e-paper can maintain a shape of the formed image and/or a shape of the formed text without additional power supply.

The transparent sensor unit 200 is provided to one face of the flexible display unit 100 and is flexed together with the flexible display unit 100. The transparent sensor unit 200 generates an electrical variation in accordance with a flex of the flexible display unit 100. In addition, a control unit interprets a 3D shape of the flexible display unit 100 based on the electrical change.

In particular, referring to FIG. 2, the transparent sensor unit 200 may include a transparent substrate 210, a plurality of sensor electrodes 230 formed on the transparent substrate 210, and an electrode line 250 connected to one or both ends of each of the sensor electrodes 230.

The transparent substrate 210 may be formed of a transparent material capable of transmitting an image output from the display unit 100. As the transparent substrate 210 should be flexible, the transparent substrate 210 may be made of such a film as a TAC (triacetylcellulose) film, a PVA (polyvinyl alcohol) film, a PI (polyimide) film and the like.

Each of the sensor electrodes 230 plays a role in generating an electrical variation if the flexible display unit 100 is flexed. In particular, a plurality of the sensor electrodes 230 may be formed in a predetermined pattern on the transparent substrate 210. Each of the sensor electrodes 230 may be made of such a transparent and conductive material as transparent conductive oxide (e.g., indium tin oxide (ITO), antimony tin oxide (ATO), etc.), transparent conductive polymer (e.g., poly(3,4-ethyleneoxythiophene), etc.) and the like.

The electrode line 250 is connected to one or both ends of the sensor electrode 230. The electrode line 250 plays a role in supplying a power to the sensor electrode 230. Further, the electrode line 250 also plays a role in delivering an electrical variation of the sensor electrode 230, which is generated when the flexible display unit 100 is flexed, to the control unit. Preferably, the electrode line 250 is made of such a good conductive material as silver (Ag) and the like.

The transparent sensor unit 200 may be formed of one face of the flexible display unit 100, the other face of the flexible display unit 100, or both faces of the flexible display unit 100. In particular, when the sensor electrode 230 generates an electrical variation by being flexed in one body of the flexible display unit 100, since it is only necessary for the transparent sensor unit 200 to interpret a 3D shape, a separate layer may be inserted between the flexible display unit 100 and the transparent sensor unit 200.

Moreover, the control unit can measure a point of a contact with a user via the transparent sensor unit 200. In particular, the control unit can measure the contact point with the user based on a capacitance variation of the sensor electrode 230, which is generated by a user's contact with the display device. Hence, a screen having an image displayed thereon by the display device can play a role as a touchscreen, and be applicable as a display module of a smart TV, a mobile terminal or the like. In this instance, the transparent sensor unit 200 may be provided to one face of the flexible display unit 100 facing a user to receive a user's contact.

The transparent sensor unit 200 of the present invention is non-limited by the above description. The transparent sensor unit 200 may include all kinds of sensor means for measuring a 3D shape of the flexible display unit 100. For example, the flexible display unit 100 may include one of an infrared sensor, an ultrasonic sensor and the like.

Meanwhile, in order to implement a 3D stereoscopic image, there are a glasses type technology and a non-glasses type technology. The glasses type technology uses a glasses device separate from a display device. Thus, in order to watch a 3D stereoscopic image, a user has to wear the glasses device. Although the glasses type technology is advantageous in implementing a 3D stereoscopic image irrespective of a position of a user, it is disadvantageous in that the glasses type technology requires a separate device. The non-glasses type technology enables a user to watch a 3D stereoscopic image without a separate glasses device by means of adding a side configuration to a display device. Although it is advantageous in that the non-glasses type technology does not need a separate device, the non-glasses type technology is disadvantageous in that a user has a limited viewable position in accordance with a viewpoint to watch a 3D stereoscopic image.

In the following description, the technical configurations and principles for the 3D stereoscopic image implementation of a display apparatus according to the present invention are explained with reference to FIGS. 3 and 4.

Figure 3:
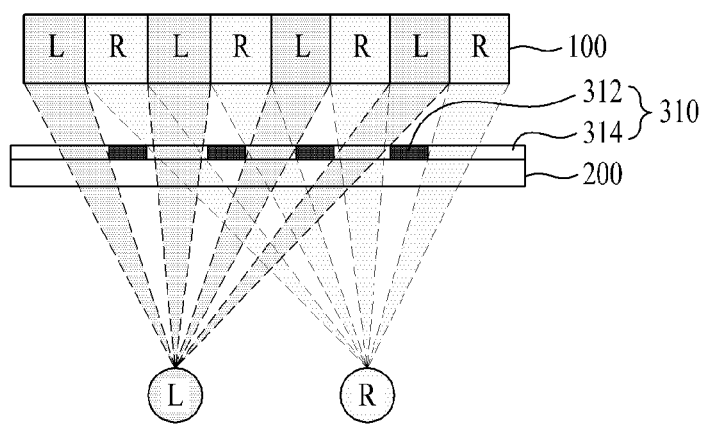
FIG. 3 is a diagram for the concept of the implementation principle of a 3D image of a parallax barrier according to one embodiment of the present invention.

In particular, FIG. 3 is a diagram illustrating the concept of the implementation principle of a 3D image of a parallax barrier 310 according to one embodiment of the present invention. Referring to FIG. 3, according to the present invention, the parallax barrier 310 is provided between a flexible display 100 and a transparent sensor unit 200.

Left eye images and right eye images are discriminately and simultaneously output from the flexible display 100. Each of the left and right eye images contains visual information in accordance with disparity to enable a user to sense a 3D effect.

The parallax barrier 310 includes a plurality of cutoff or blocking parts 312 configured to selectively cut off the left eye image or the right eye image output from the flexible display unit 100 and a plurality of transmittive parts 314 configured to selectively transmit the left eye image or the right eye image. The cutoff part 312 and the transmittive part 314 are alternately arranged and configure a stripe pattern extending in direction vertical to a user.

In particular, some of a plurality of the cutoff parts 312 restrict a light path of a right eye image to prevent the right eye image of the flexible display unit 100 from being incident on a left eye of a user, while the rest of the cutoff parts 312 restrict a light path of a left eye image to prevent the left eye image of the flexible display unit 100 from being incident on a right eye of the user. Hence, the left eye image and the right eye image are selectively incident of the user's left eye and the user's right eye via the transmittive part 314, respectively, thereby enabling the user to watch a 3D stereoscopic image.

Figure 4:
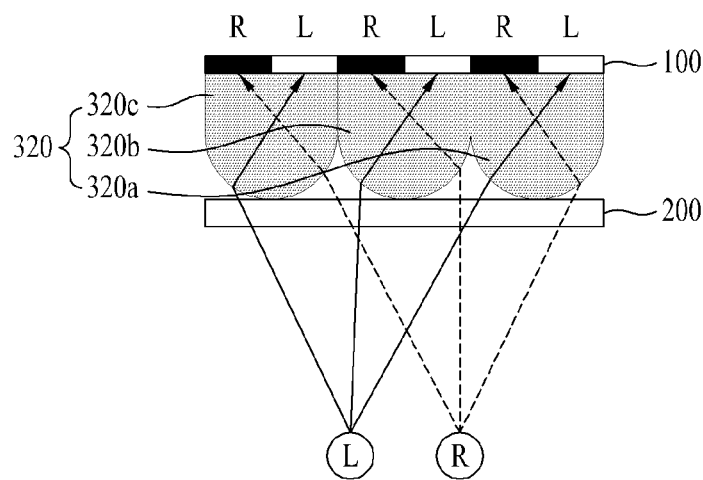
FIG. 4 is a diagram for the concept of the implementation principle of a 3D image of a lenticular lens according to one embodiment of the present invention.

Next, FIG. 4 is a diagram illustrating the concept of the implementation principle of a 3D image of a lenticular lens 320 according to one embodiment of the present invention. Referring to FIG. 4, lenticular lens 320 is provided between the flexible display unit 100 and the transparent sensor unit 200. Likewise, a left eye image and a right eye image are discriminatively output from the flexible display unit 100.

The lenticular lens 320 include a plurality of lenses 320a, 320b and 320c, each of which has a hemispherical cross-section, configured to extend in direction vertical to a user. A plurality of the lenses 320a, 320b and 320c are arranged 2-dimensionally on a plane. The lenticular lens 320 refracts the left eye image and the right eye image of the flexible display unit 100 to enable the left eye image and the right eye image to be incident on a user's left eye and a user's right eye, thereby providing the user with a 3D stereoscopic image.

On the other hand, in order to implement a 3D stereoscopic image, a display apparatus may include polarizing filter glasses. In particular, a user wears the polarizing filter glasses to watch a 3D stereoscopic image displayed on the flexible display unit 100. In the polarizing filter glasses, a left eye polarizing film and a right eye polarizing film, between which a phase difference of 90 degrees exists, are attached to a left side and a right side, respectively. A left eye image does not pass through the right eye polarizing film but is incident on a left eye via the left eye polarizing film. Further, a right eye image does not pass through the left eye polarizing film but is incident on a right eye via the right eye polarizing film. Hence, a user can sense a 3D stereoscopic image in accordance with different visual information applied to left and right eyes of the user, respectively.

In order to implement a 3D stereoscopic image, a display apparatus may include shutter glasses. Likewise, a user can watch a 3D stereoscopic image only when wearing the shutter glasses. In doing so, the control unit controls the flexible display unit 100 to display a left eye image and a right eye image alternately and sequentially.

In addition, a right eye glass of the shutter glasses cuts off a light when a left eye image is displayed on the flexible display unit 100. Further, a left eye glass of the shutter glasses cuts off a light when a right eye image is displayed on the flexible display unit 100. Hence, as a left eye image and a right eye image are provided to a left eye and a right eye of a user, the user can sense a corresponding 3D stereoscopic image.

The control unit of the present invention adjusts a 3D depth value of a region, from which a flex of the flexible display unit 100 is generated, by interpreting a 3D shape of the flexible display unit 100 based on an electrical variation generated from the transparent sensor unit 200. Accordingly, the present invention can implement a 3D stereoscopic image in a display apparatus in a flexed state by adjusting a 3D depth value individually by partitioning a region of the flexible display unit 100 in accordance with a 3D shape of the flexible display unit 100, thereby providing a user with various 3D effects.

A process for the control unit to interpret a 3D shape of the flexible display unit 100 is schematically described with reference to FIG. 5 as follows. In particular, FIG. 5 is a cross-sectional diagram of a display apparatus illustrating a distance variation of a sensor electrode in accordance with a flex of a flexible display.

Figure 5:
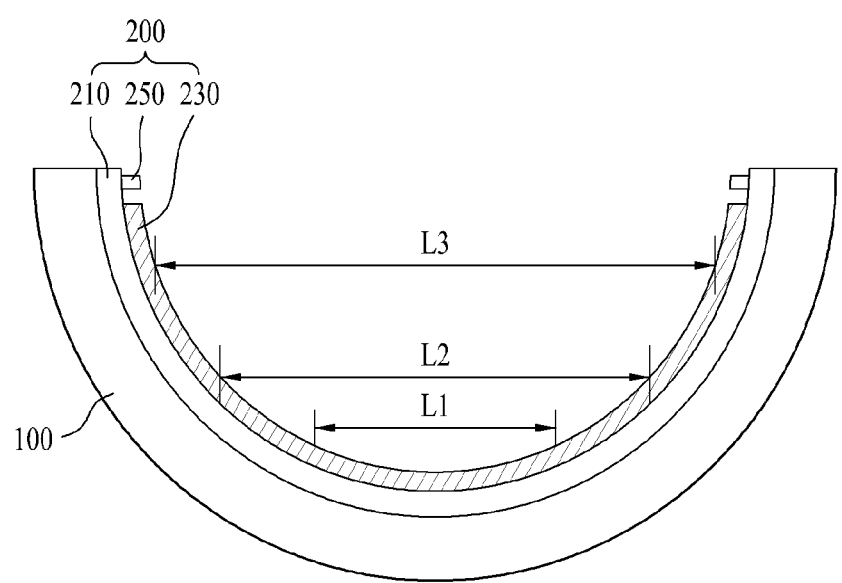
FIG. 5 is a cross-sectional diagram of a display apparatus to illustrate a distance variation of a sensor electrode in accordance with a flex of a flexible display.

Referring to FIG. 5, if the flexible display unit 100 is flexed, the transparent sensor unit 200 provided to one face of the flexible display unit 100 is flexed together with the flexible display unit 100. A predetermined voltage is applied to the sensor electrode 200 via an electrode line 250 in the transparent sensor unit 200. Hence, when the flexible display unit 100 is flexed, a capacitance variation is generated from the sensor electrode 230.

In particular, the more the flex of the flexible display unit 100 gets, the less a corresponding distance L1/L2/L3 of the electrode sensor electrode becomes. In particular, the more an extent of the flex of the flexible display unit 100 gets, the closer the sensor electrode 230 gets to itself. Hence, a capacitance variation of the sensor electrode 230 increasingly rises. The control unit can know the flex extent of the flexible display unit 100 via the variation of the capacitance and can measure a flexed region of the flexible display unit 100. Therefore, the control unit can measure a 3D stereoscopic shape of the flexible display unit 100 by synthesizing the capacitance variations generated from a plurality of the sensor electrodes 230.

Figure 6:
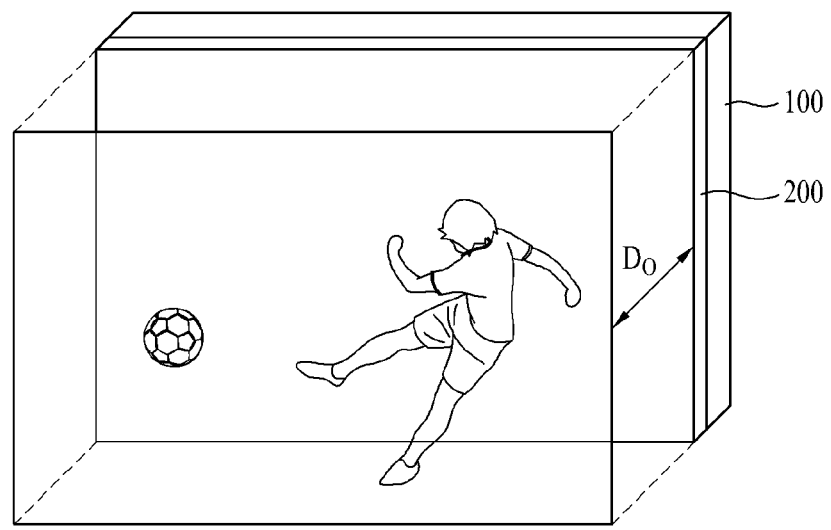
FIG. 6 is a perspective diagram of a display apparatus to illustrate a 3D image on a flexible display unit in a planar state.
Figure 6:
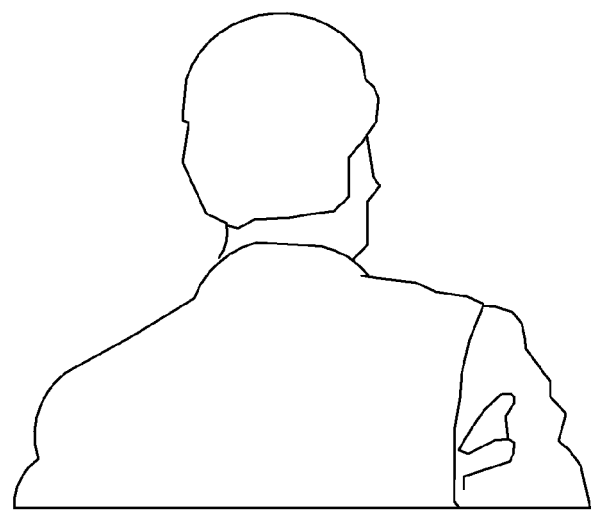
Figure 7:
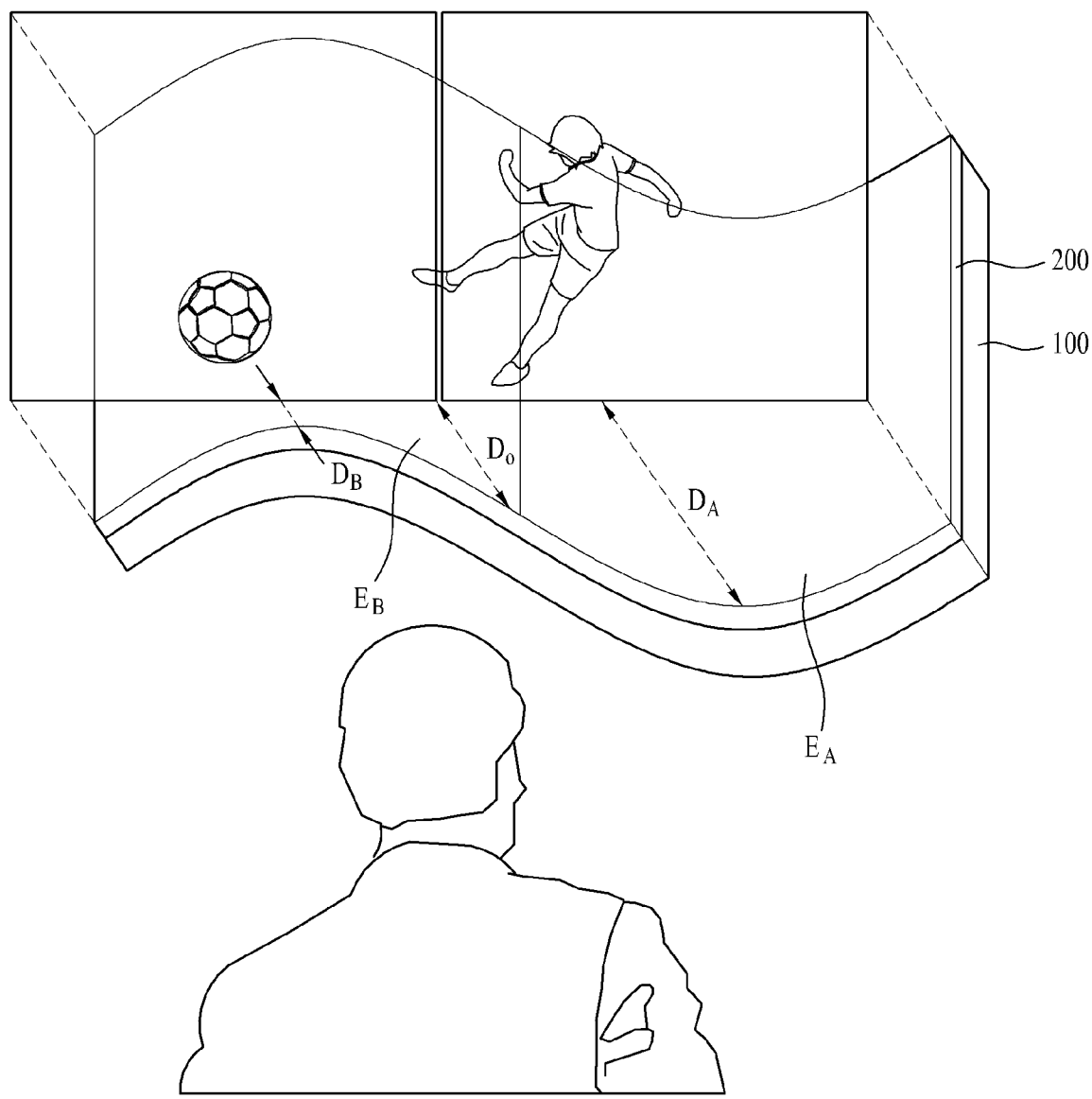
FIGS. 7 to 10 are perspective diagrams of a display apparatus to illustrate a 3D depth value adjusted 3D image on a 3D shape changed flexible display unit.

Next, FIG. 6 is a perspective diagram of a display apparatus illustrating a 3D image on the flexible display unit 100 in a planar state. FIGS. 7 and 9 are perspective diagrams of a display apparatus illustrating a 3D depth value adjustment for 3D stereoscopic image implementation when a flex is generated. In the following description, when the flexible display unit 100 is flexed, a 3D depth adjustment by a control unit for 3D stereoscopic image implementation is explained with reference to FIGS. 6 to 8.

Referring to FIG. 6, the flexible display unit 100 provides a user with a 3D stereoscopic image with a 3D depth value D0 set equal to that of a normal 3D display. Yet, according to a related art, even if the flexible display unit 100 is flexed, the 3D depth value D0 of the flexible display unit 100 in a planar state is maintained intact. Hence, the related art causes a problem that a 3D stereoscopic image is not implemented in a display apparatus and a corresponding 3D effect is degraded.

Figure 8:
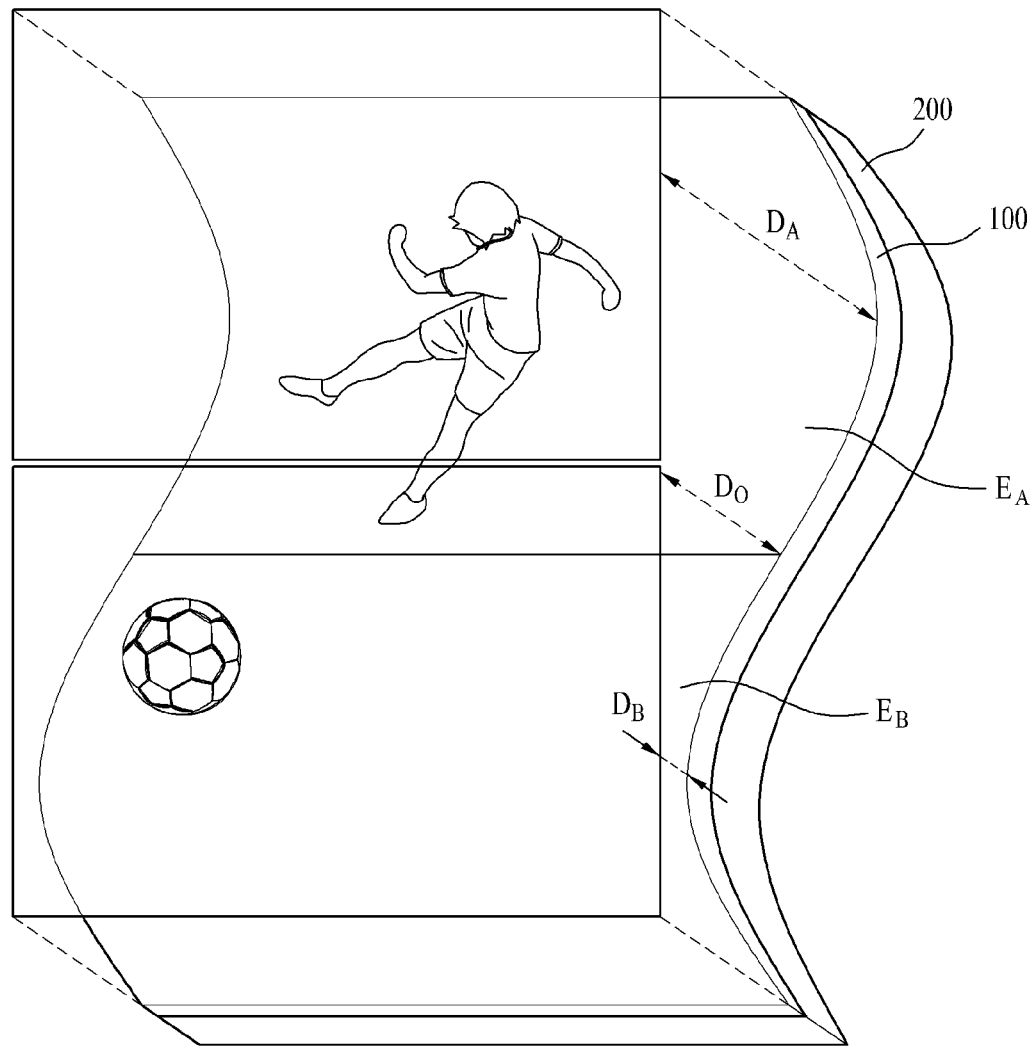
Figure 9:
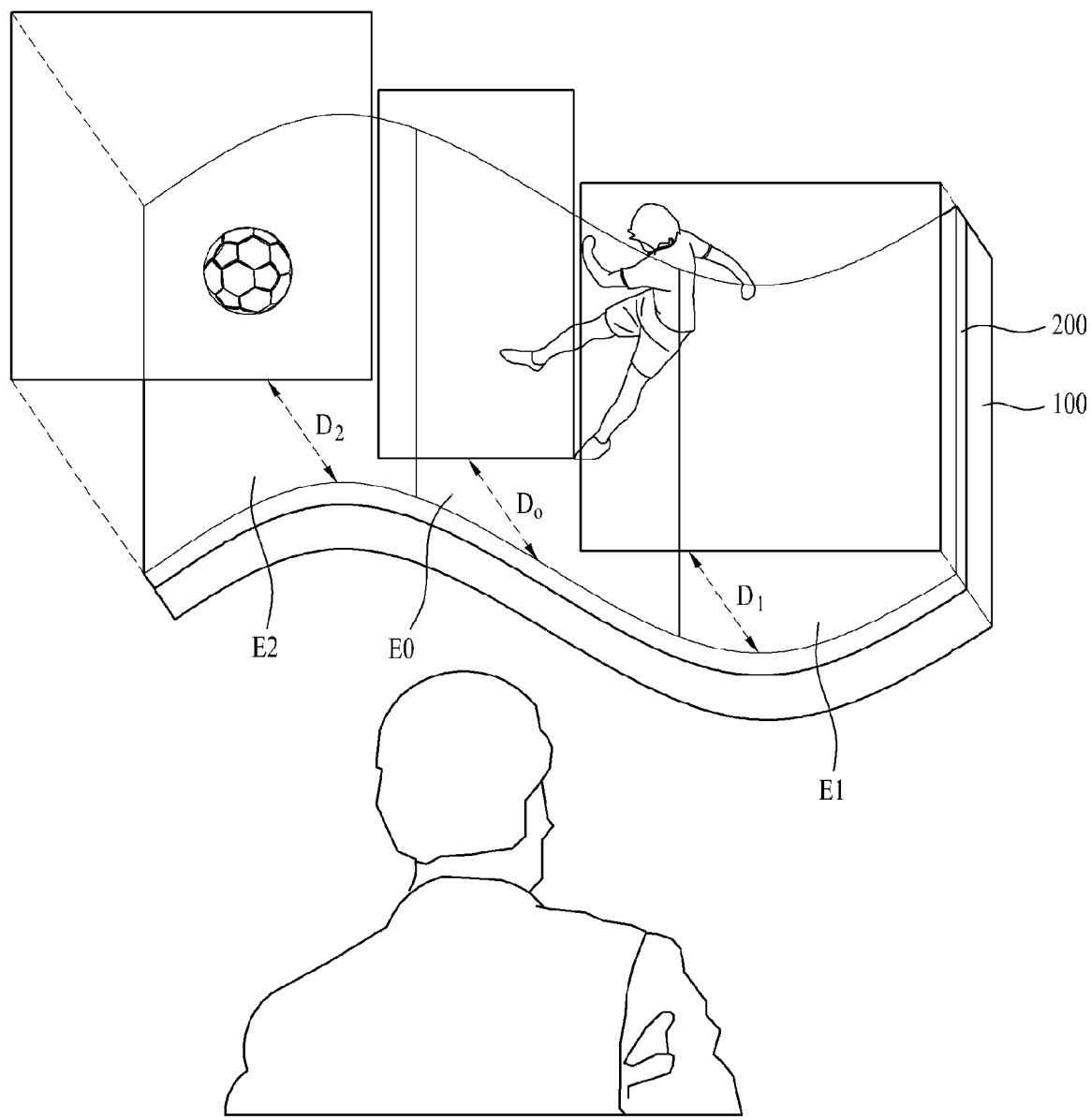

Referring to FIGS. 7 and 8, the present invention controls the flexible display unit 100 by decreasing a 3D depth value DB of a flexible display unit region EB flexed convexly forward and increasing a 3D depth value DA of a flexible display unit region EA flexed concavely backward. In this instance, 'forward' means a direction in which a user is located, and 'backward' means a direction opposite to the user located direction.

For the forward convexly flexed flexible display unit EB, a 3D stereoscopic image is relatively viewed as if projected convexly or elongated. As a result, the control unit decreases the 3D depth value of the convexly flexed flexible display unit region EB to become lower than a 3D depth value of a normal state, thereby canceling out the convexly projected view effect according to the flex of the flexible display unit 100. In doing so, a region having a higher flex extent (i.e., flex rate) of the convexly flexed display unit region EB has a larger decrease of a 3D depth value.

For the backward concavely flexed flexible display unit EA, a 3D stereoscopic image is relatively viewed as if recessed. As a result, the control unit increases the 3D depth value DA of the concavely flexed flexible display unit region EA to be raised higher than a 3D depth value of a normal state, thereby canceling out the recessed view effect according to the flex of the flexible display unit 100. In doing so, a region having a higher flex extent (i.e., flex rate) of the concavely flexed display unit region EA has a greater increase of a 3D depth value.

Meanwhile, the increase/decrease of the 3D depth value can include adding/subtracting a predetermined value to/from a 3D depth value set per region of a planar state flexible display unit 100. Hence, if the control unit increases a 3D depth value of a predetermined region by setting a predetermined value to a preset 3D depth value of the corresponding region of the planar state flexible display unit 100. In particular, although the same 3D depth value is shown in the drawings, the 3D depth value for each region of the flexible display unit 100 may vary.

As the control unit increases or decreases the 3D depth value in the above-described manner, referring to FIGS. 7 and 8, even if the flexible display unit 100 is flexed like the former 3D stereoscopic image (cf. FIG. 6) of the planar state flexible display unit 100, the control unit can implement the 3D stereoscopic image.

Figure 10:
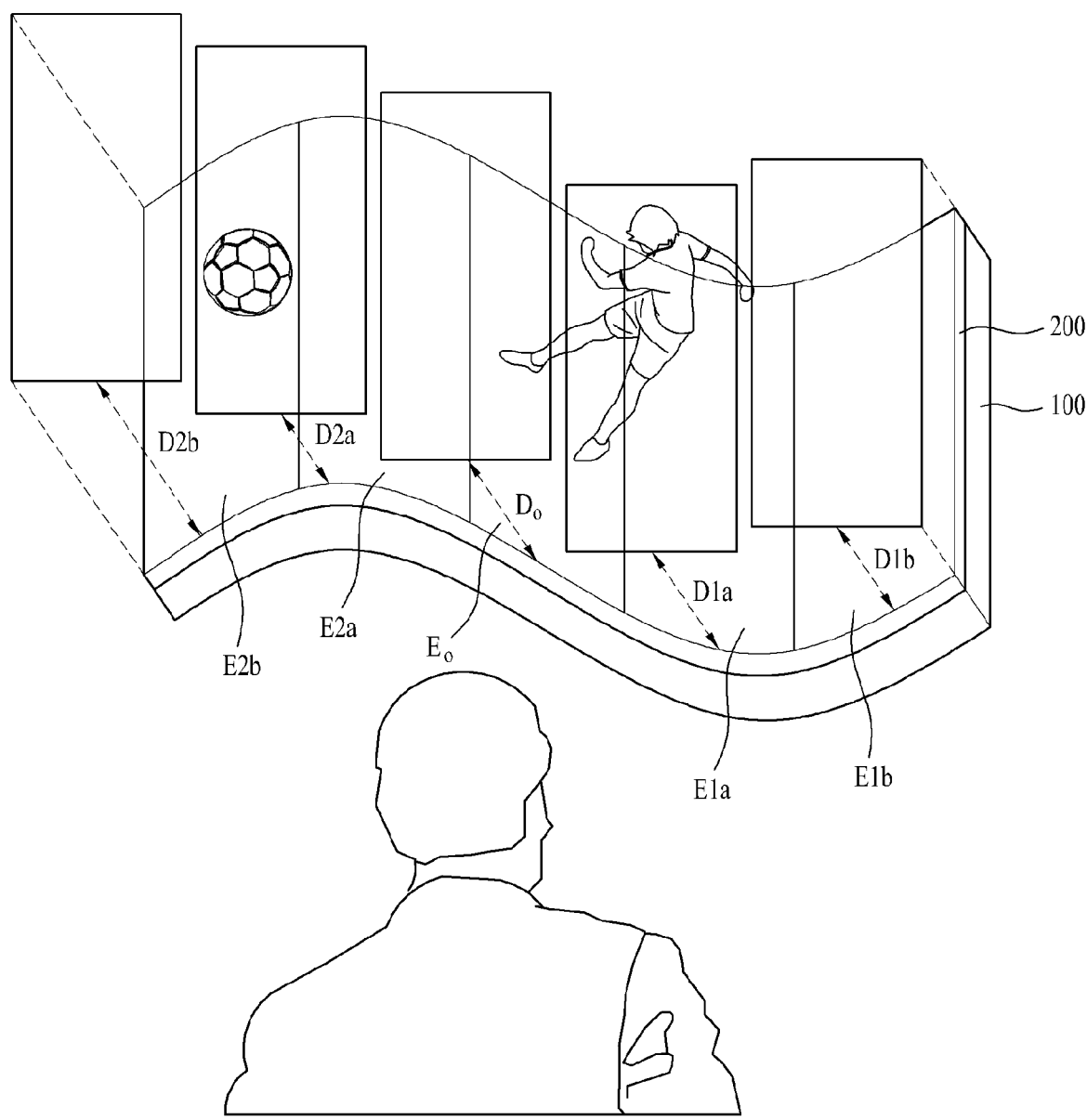

Next, FIGS. 9 and 10 are perspective diagrams of a display apparatus illustrating 3D depth value adjustment by the flexible display unit 100 partitioned into a plurality of regions. In the following description, a function of a control unit for a 3D effect enhancement of a display apparatus is explained with reference to FIG. 9 and FIG. 10.

Referring to FIG. 9, the flexible display unit 100 is partitioned into a plurality of regions E0, E1 and E2. In particular, the flexible display unit 100 has at least one preset region E0 and is partitioned into a left region E1 adjacent to the preset region E0 and a right region E2 adjacent to the preset region E0.

In this instance, the preset region E0 of the flexible display unit 100 indicates a region randomly set as a reference for partitioning the flexible display unit 100 into a plurality of regions. Optionally, a plurality of preset regions E0 may be set. The preset region E0 may play a role as a region having a 3D depth value D0 that becomes a reference in adjusting 3D depth values of a plurality of the regions of the flexible display unit 100 or may have a technical meaning related to other 3D stereoscopic effects.

Each of the left region E1 and the right region E2 is the region adjacent to the preset region E0. Further, the left region E1 and the right region E2 can be set to different 3D depth values D1 and D2 to various 3D effect implementations and 3D effect enhancement. As mentioned in the foregoing description, for the 3D effect correction attributed to the flex of the flexible display unit 100, the 3D depth values D1 and D2 of the left region E1 and the right region E2 may be individually adjusted.

In order to further enhance the 3D effect in accordance with an image content, the 3D depth values D1 and D2 of the left region E1 and the right region E2 may be adjusted differently. For instance, the 3D depth value D1 of the left region E1 is raised to enable a 3D stereoscopic image of the left region E1 to look closer by being further projected. In another instance, the 3D depth value D1 of the left region E1 is lowered to enable the 3D stereoscopic image to look concave or raise depth perception. In still another instance, increasing the 3D depth value D1 of the left region E1 and decreasing the 3D depth value D2 of the right region E2 implements a step-like 3D effect of the 3D stereoscopic image.

In doing so, each of the left region E1 and the right region E2 may be configured to be adjacent to one of top, bottom, right and left sides of the preset region E0. Alternatively, either the left region E1 or the right region E2 may be configured to enclose the preset region E0. Alternatively, each of the left region E1 and the right region E2 may be configured to be spaced apart from the preset region E0.

Referring to FIG. 10, the control unit can subdivide each of the left region E1 and the right region E2 into a plurality of unit regions E1a, E1b, E2a and E2b. In particular, after the flexible display unit 100 has been subdivided into a plurality of the unit regions E1a, E1b, E2a and E2b, 3D depth values D1a, D1b, D2a and D2b are individually adjusted, whereby a 3D effect of a 3D stereoscopic image can be enhanced and a detailed 3D effect can be provided. A shape of each of a plurality of the unit regions E1a, E1b, E2a and E2b may have such a shape as a circle, a triangle, a quadrangle and the like. Further, the shapes of a plurality of the unit regions E1a, E1b, E2a and E2b may be configured different from each other.

Figure 11:
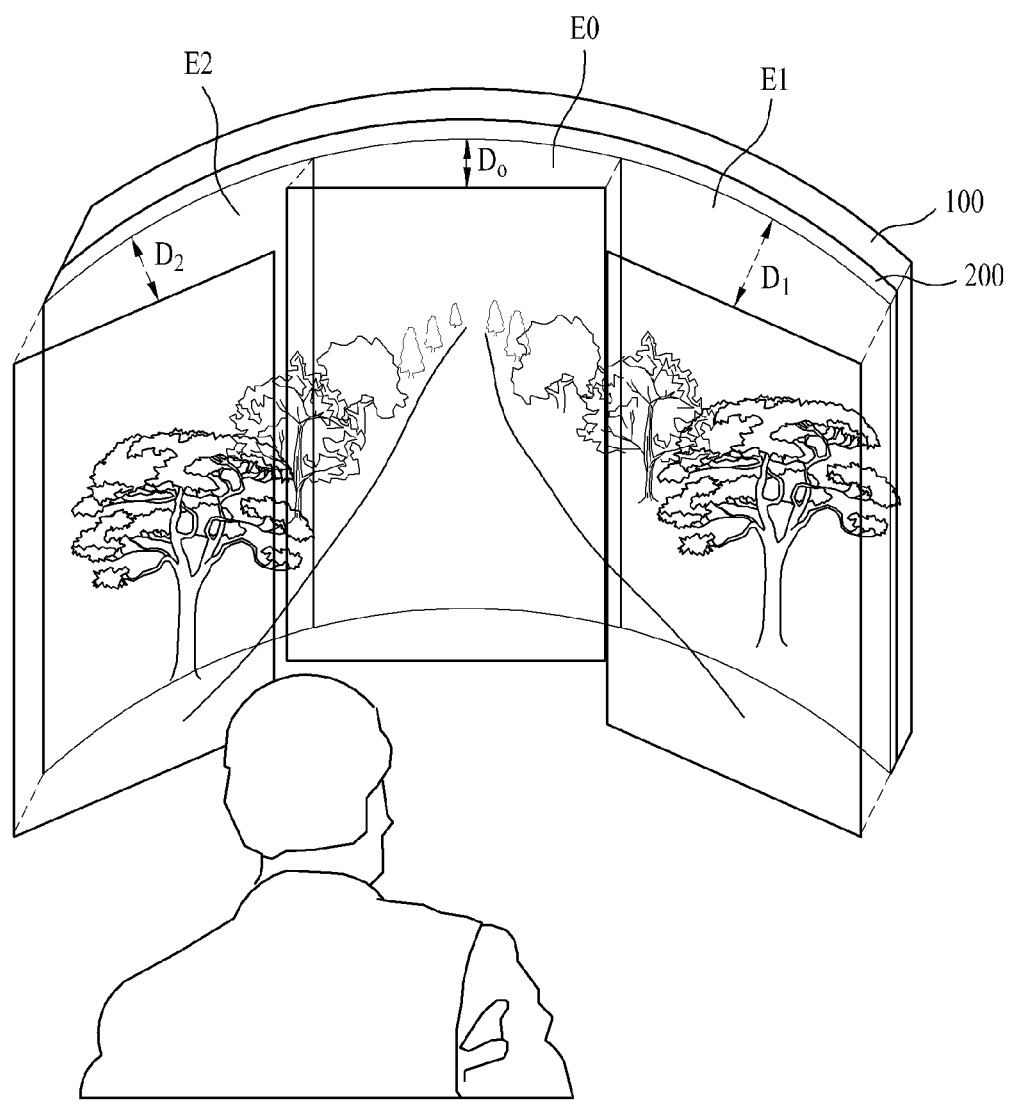
FIG. 11 and FIG. 12 are perspective diagrams of a display apparatus to illustrate a 3D depth value adjusted 3D image when a flexible display unit is concavely flexed to surround a user.
Figure 12:
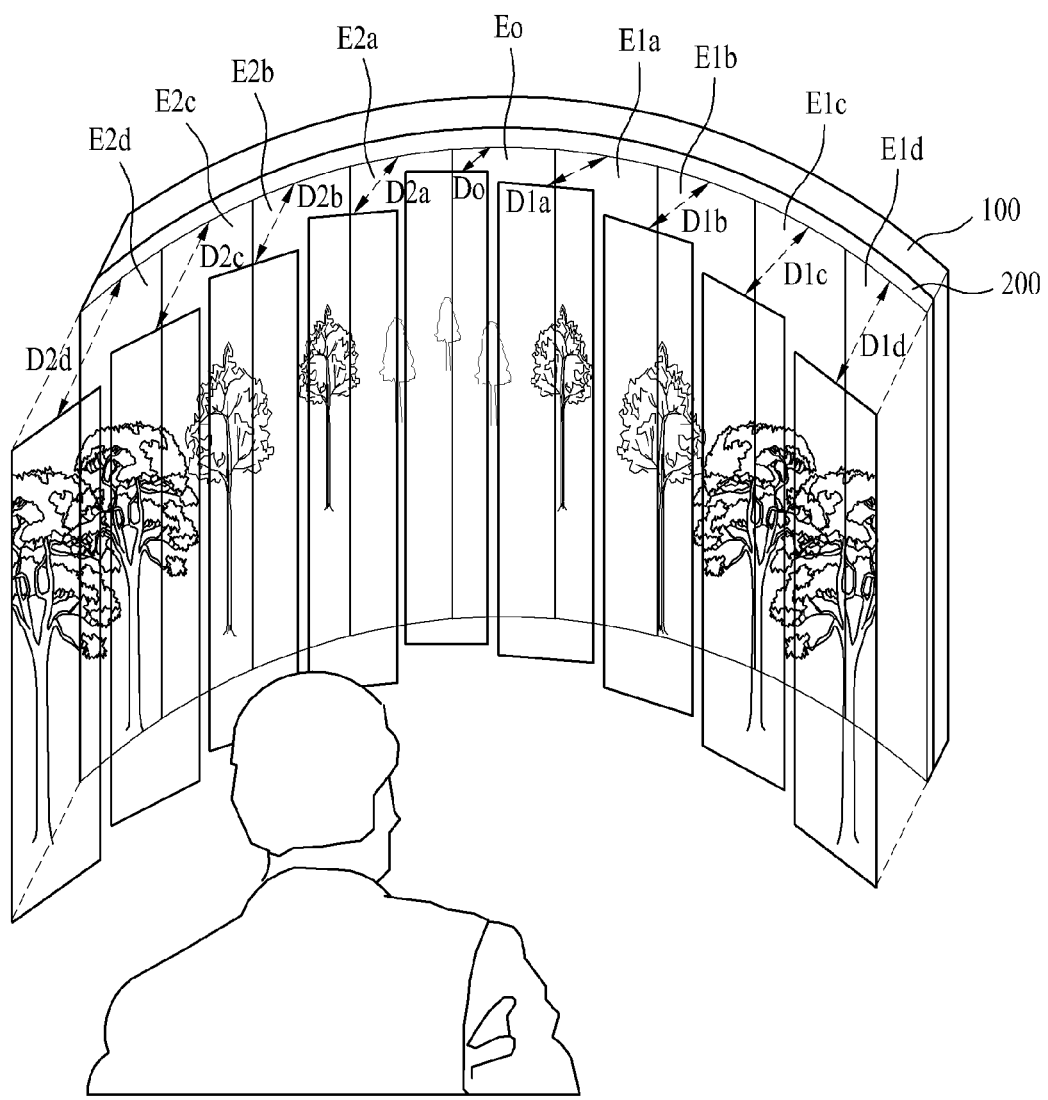

Next, FIGS. 11 and 12 are perspective diagrams of a display apparatus illustrating a 3D depth value adjusted 3D image when the flexible display unit 100 is concavely flexed centering on a user. In the following description, when the flexible display unit 100 is concavely flexed to surround a user, a process for a control unit to adjust a 3D depth value is explained with reference to FIGS. 11 and 12.

Referring to FIG. 11, when the flexible display unit 100 is concavely flexed to surround a user, the flexible display unit 100 is partitioned into a plurality of regions E1 and E2 centering on a preset region E0. In particular, a region of the flexible display unit 100 located in the very front of a user is the preset region E0 becoming a reference of a 3D depth value for 3D effect implementation. In this instance, the preset region E0 indicates the region that is located in the very front view of a user when the user confronts the very center of the flexible display unit 100.

In this instance, a left region E1 indicates a region of the flexible display unit 100 adjacent to a left side of the preset region E0, while a right region E2 indicates a region of the flexible display unit 100 adjacent to a right side of the preset region E0. The control unit raises a 3D depth values D1/D2 of the left/right region E1/E2 to be greater than a 3D depth value D0 of the preset region E0. Hence, in viewpoint of a user, a 3D stereoscopic image displayed on the left region E1 located at a right side of the user or a 3D stereoscopic image displayed on the right region E2 located at a left side of the user look projected further than a 3D stereoscopic image displayed on the preset region E0 located in the very front of the user. Since the flexible display unit 100 is flexed concavely to surround the user to give a sense of an inner space and the 3D stereoscopic images on the left and right sides of the user look further projected, the user can sense a 3D stereoscopic effect as if situated within the 3D stereoscopic image.

Specifically, when a depth perception representing image is output from the flexible display unit 100, as shown in FIG. 11, a short distance representing image output from the left region E1 or the right region E2 looks projected and a long distance representing image output from the right region E2 looks relatively recessed backward. Hence, a user can sense a 3D stereoscopic effect as if actually situated within the 3D stereoscopic image.

Referring to FIG. 12, the control unit can subdivide the left region E1 and the right region E2 of a concavely flexed flexible display unit 100 into a plurality of left unit regions E1a, E1b, E1c and E1d and a plurality of right unit regions E2a, E2b, E2c and E2d, respectively. In doing so, the control unit can control a plurality of the unit regions to have 3D depth values raised increasingly in proportion to a spaced distance from the preset region E0. In particular, the control unit may control the flexible display unit 100 to have the 3D depth value of each of a plurality of the left unit regions E1a, E1b, E1c and E1d in a manner that the 3D depth value of the unit region located at the left side is greater than that of the unit region located at the right side.

In more detail, assuming that the left unit region E1a located at the left side of the preset region E0 is named a $1^{st}$ left unit region and so on, if the unit regions of the left region E1 are numbered in order, a $2^{nd}$ left unit region E1b has a 3D depth value D1b greater than that of the $1^{st}$ left unit region E1a located to the right and a $3^{rd}$ left unit region E1c has a 3D depth value D1c greater than that of the $2^{nd}$ left unit region E1b located to the right. Hence, the 3D depth values D1a, D1b, D1c and D1d of the left unit regions E1a, E1b, E1c and E1d are increasingly raised in order as getting distant from the preset region E0.

Moreover, the control unit can control the flexible display unit 100 to have the 3D depth value of each of a plurality of the right unit regions E2a, E2b, E2c and E2d in a manner that the 3D depth value of the unit region located at the right side is greater than that of the unit region located at the left side. In particular, assuming that the right unit region E2a located at the right side of the preset region E0 is named a $1^{st}$ right unit region and so on, if the unit regions of the right region E2 are numbered in order, a $2^{nd}$ right unit region E2b has a 3D depth value D1b greater than that of the $1^{st}$ right unit region E2a located to the right and a $3^{rd}$ right unit region E2c has a 3D depth value D2c greater than that of the $2^{nd}$ right unit region E2b located to the right.

Hence, each of the left region E1 and the right region E2 is subdivided into a plurality of the unit regions and the 3D depth values are increasingly and sequentially raised in user-located direction, whereby the user can sense a 3D stereoscopic effect in further detail as if situated within a 3D stereoscopic image. Further, in accordance with a space shape represented in an image output from the flexible display unit 100, if the 3D depth values D0, D1 and D2 of the preset region E0, the left region E1 and the right region E2 are individually adjusted to correspond to the space shape, a user can sense a 3D stereoscopic effect as if situated within the image.

On the contrary, when the flexible display unit 100 is flexed to be projected toward a user or that the adjacent regions E1 and E2 are flexed backward to be situated behind the preset region E0, a 3D depth value of each of the regions E1 and E2 adjacent to the preset region E0 may be adjusted smaller than that of the preset region E0.

Figure 13:
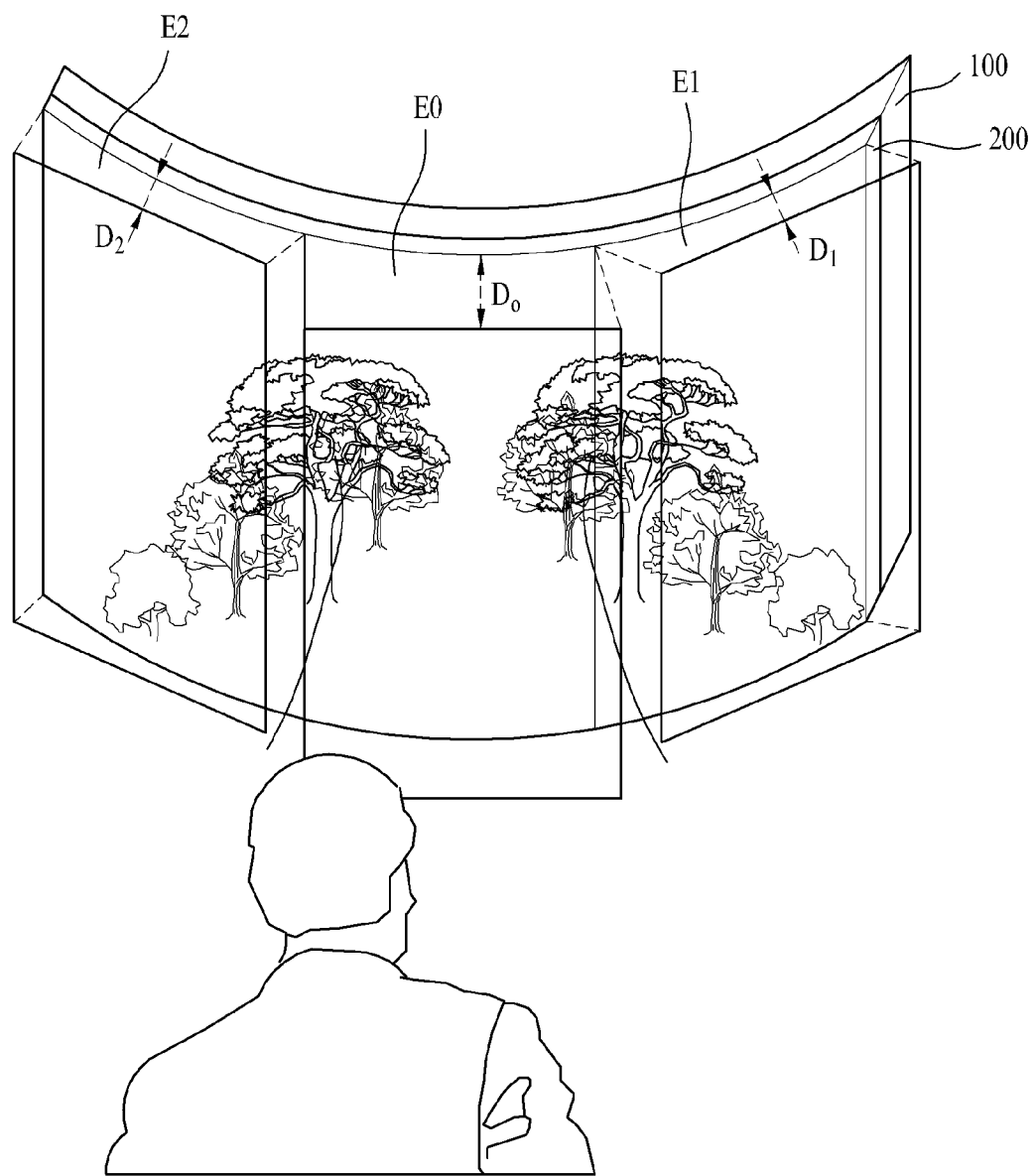
FIG. 13 and FIG. 14 are perspective diagrams of a display apparatus to illustrate a 3D depth value adjusted 3D image when a flexible display unit is convexly flexed toward a user.
Figure 14:
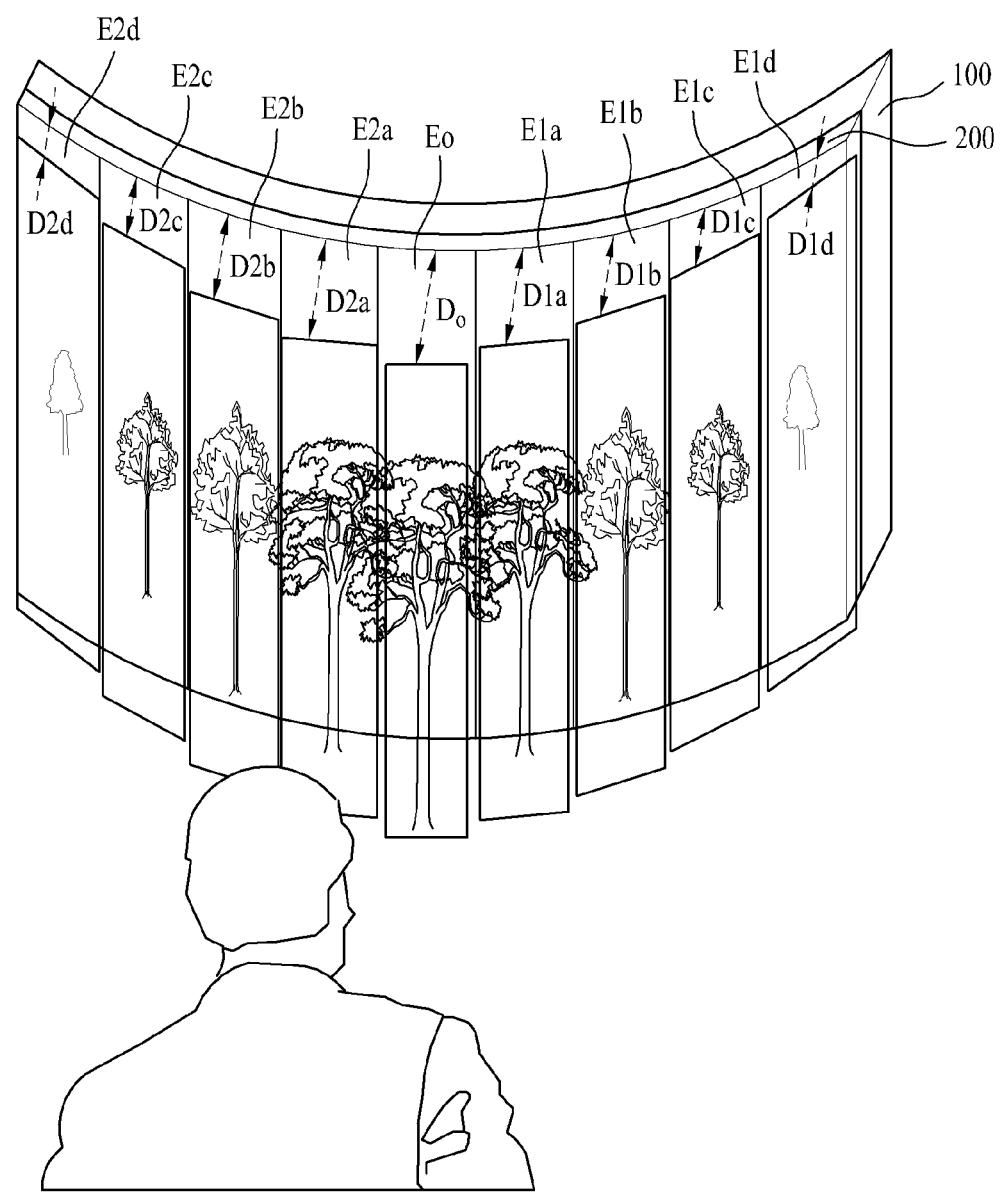

Next, FIGS. 13 and 14 are perspective diagrams of a display apparatus illustrating a 3D depth value adjusted 3D image when a flexible display unit is convexly flexed toward a user. Referring to FIG. 13, although the preset region E0 is situated at the center and the center is projected, it may be unnecessary to be situated at the center. Instead, the preset region E0 may be situated by inclining to a left or right side. In this instance, an adjacent region may include either the left region E1 or the right region E2.

Thus, if a 3D depth value of the adjacent region E1 or E2 flexed behind the present region E0 is set smaller than that of the preset region E0, an image output to a screen of the preset region E0 may look further projected. Hence, as an image approaching in screen direction like a bullet is sensed as real, an enhanced 3D stereoscopic effect may be given to a user.

Referring to FIG. 14, the control unit can subdivide the left region E1 and the right region E2 of a convexly flexed flexible display unit 100 into a plurality of left unit regions E1a, E1b, E1c and E1d and a plurality of right unit regions E2a, E2b, E2c and E2d, respectively. In doing so, the control unit can control a plurality of the unit regions to have 3D depth values decreased gradually in proportion to a spaced distance from the preset region E0.

In particular, the control unit can control the flexible display unit 100 to have the 3D depth value of each of a plurality of the left unit regions E1a, E1b, E1c and E1d in a manner that the 3D depth value of the unit region located at the left side is smaller than that of the unit region located at the right side.

That is, a $2^{nd}$ left unit region E1b has a 3D depth value D1b smaller than that of a left unit region E1a located to the right and a $3^{rd}$ left unit region E1c has a 3D depth value D1c smaller than that of the $2^{nd}$ left unit region E1b located to the right. Hence, the 3D depth values D1a, D1b, D1c and D1d of the left unit regions E1a, E1b, E1c and E1d are sequentially decreased in order as getting distant from the preset region E0.

Moreover, the control unit can control the flexible display unit 100 to have the 3D depth value of each of a plurality of the right unit regions E2a, E2b, E2c and E2d in a manner that the 3D depth value of the unit region located at the right side is smaller than that of the unit region located at the left side. In particular, a $2^{nd}$ right unit region E2b has a 3D depth value D2b smaller than that of a $1^{st}$ right unit region E2a located to the right and a $3^{rd}$ right unit region E2c has a 3D depth value D2c smaller than that of the $2^{nd}$ right unit region E2b located to the right.

Hence, each of the left region E1 and the right region E2 is subdivided into a plurality of the unit regions and the 3D depth values are sequentially decreased in user-located direction, whereby the user can sense a 3D stereoscopic effect in further detail.

Figure 15:
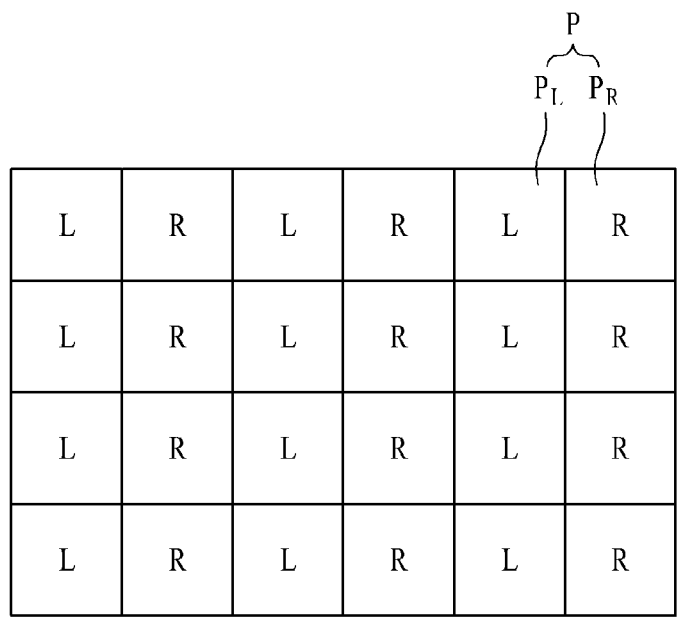
FIG. 15 is a diagram for a pixel structure of a flexible display unit according to one embodiment of the present invention.

Next, FIG. 15 is a diagram for a pixel structure of the flexible display unit 100 according to one embodiment of the present invention. FIGS. 16 to 19 are perspective and partially enlarged diagrams of a display apparatus and left and right eye pixels in accordance with a 3D shape of the flexible display unit 100. In the following description, a process for a control unit to adjust a color sense and brightness of left/right eye pixel in accordance with a 3D shape of the flexible display unit 100 is explained with reference to the accompanying drawings.

Referring to FIG. 15, the display unit 100 includes a plurality of unit pixels P each of which has a left eye pixel PL and a right eye pixel PR. In this instance, the left eye pixel PL indicates a minimum unit for configuring an image incident on a left eye of a user and the right eye pixel PR indicates a minimum unit for configuring an image incident on a right eye of the user. By a set of the unit pixels P, each of which includes the left eye pixel PL and the right eye pixel PR, a left eye image and a right eye image of the flexible display unit 100 may be configured.

The control unit individually adjusts a color sense and brightness of each of the left eye pixel PL and the right eye pixel PR in accordance with a 3D shape of the flexible display unit 100. Hence, since a color sense and brightness of a 3D stereoscopic image in viewpoint of a user's left/right eye are adjusted different in accordance with a 3D shape of the flexible display unit 100 in the same manner as an object is actually seen through human eyes, it can implement a 3D effect as if a user is inside the image.

Figure 16:
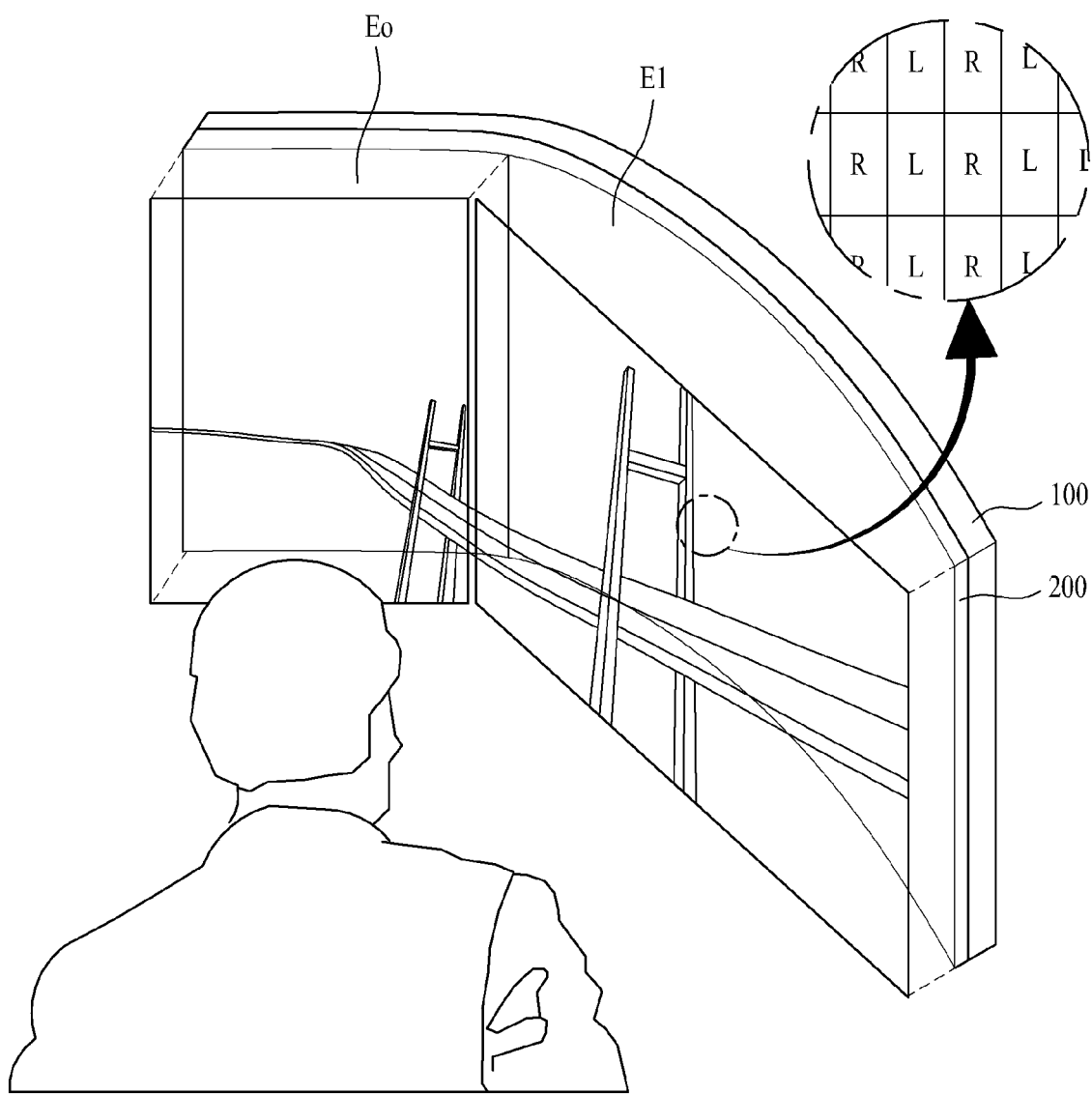
FIGS. 16 to 19 are perspective and partially enlarged diagrams of a display apparatus to illustrate color sense and brightness variations of left and right eye pixels in accordance with a 3D shape of a flexed flexible display unit.

Referring to FIG. 16, when a left region E1 adjacent to a left side of a preset region E0 is flexed forward with reference to the preset region E0 located in the very front of a user, a brightness of a right pixel PR of the left region E1 is adjusted to become greater than that of a left eye pixel PL.

A user can perceive a close object as brighter than a remote object unless a separate illumination is used. Since the flexible display unit 100 corresponding to the left region E1 is located closer to a user's right eye than a user's left eye, if the brightness of the right pixel PR of the left region E1 is raised to reflect an actual position relation between the flexible display unit 100 and the user. Therefore, the control unit can provide the user with a more realistic 3D stereoscopic image.

In the above-mentioned situation, the control unit also controls a color sense of the right eye pixel PR of the left region E1 to become greater than that of the left eye pixel PL. Hence, if the color sense of the right pixel PR of the left region E1 located closer to the user's right eye than the user's left eye is increased higher than that of the left eye pixel PL, it can enhance a 3D effect of the 3D stereoscopic image provided to the user.

Figure 17:
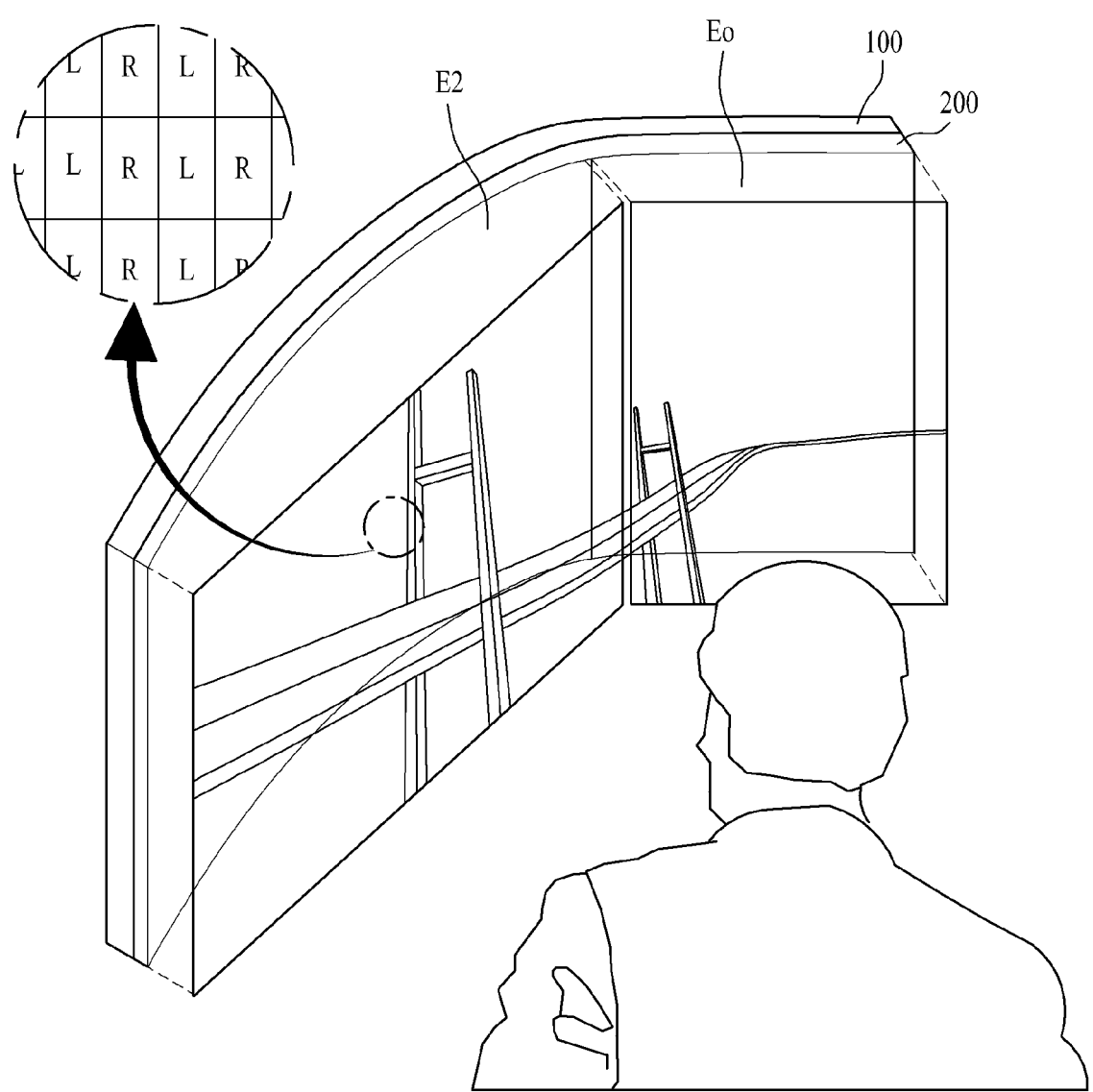

Referring to FIG. 17, when a right region E2 adjacent to a right side of a preset region E0 is flexed forward with reference to the preset region E0 located in the very front of a user, a brightness of a left pixel PL of the right region E2 is adjusted to become greater than that of a right eye pixel PR. In particular, since the flexible display unit 100 corresponding to the right region E2 is located closer to a user's left eye than a user's right eye, if the brightness of the left pixel PL is raised, it can provide the user with a more realistic 3D stereoscopic image.

In the above-mentioned situation, the control unit also controls a color sense of the left eye pixel PL of the right region E2 to become greater than that of the right eye pixel PR. Hence, if the color sense of the left pixel PL of the right region E2 located closer to the user's left eye than the user's right eye is increased higher than that of the right eye pixel PR, it can enhance a 3D effect of the 3D stereoscopic image provided to the user.

Figure 18:
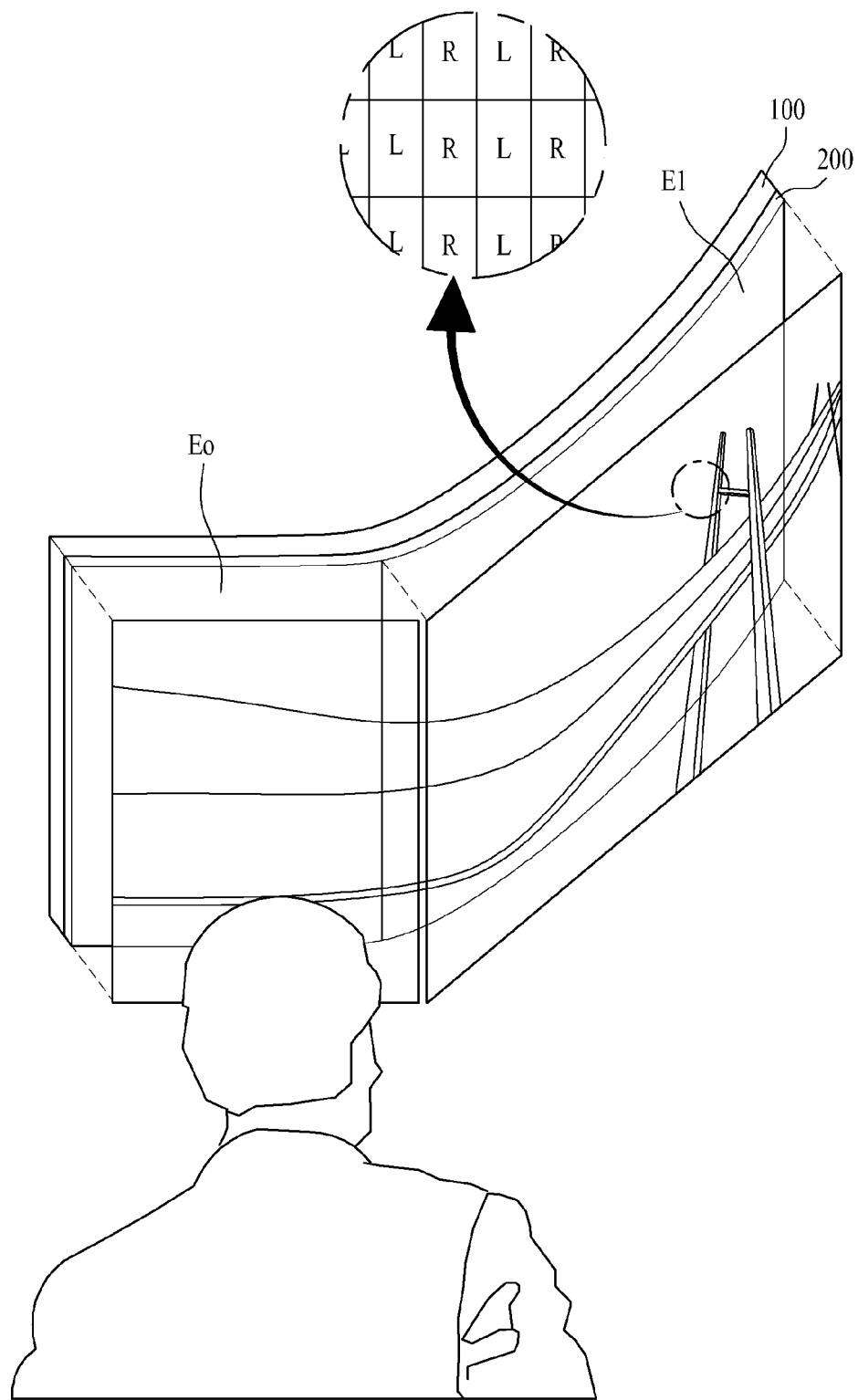

Referring to FIG. 18, when a left region E1 adjacent to a left side of a preset region E0 is flexed backward with reference to the preset region E0 located in the very front of a user, a brightness of a right pixel PR of the left region E1 is adjusted to become smaller than that of a left eye pixel PL. If the left region E1 is flexed backward, the left region E1 is located closer to a user's left eye than a user's right eye, Hence, if the brightness of the right pixel PR of the left region E1 is decreased to be lower than that of the left eye pixel PL to reflect an actual position relation between the flexible display unit 100 and the user, it can provide the user with a more realistic 3D stereoscopic image.

In the above-mentioned situation, the control unit also controls a color sense of the right eye pixel PR of the left region E1 to become smaller than that of the left eye pixel PL. Since a user tends to perceive a color sense of a remote object as thinner than that of a close object, the user senses the color sense of the right eye image of the left region E1 as thinner than that of the left eye image. Hence, if the color sense of the right pixel PR of the left region E1 located more distant from to the user's right eye than the user's left eye is decreased lower than that of the left eye pixel PL, it can enhance a 3D effect of the 3D stereoscopic image provided to the user.

Figure 19:
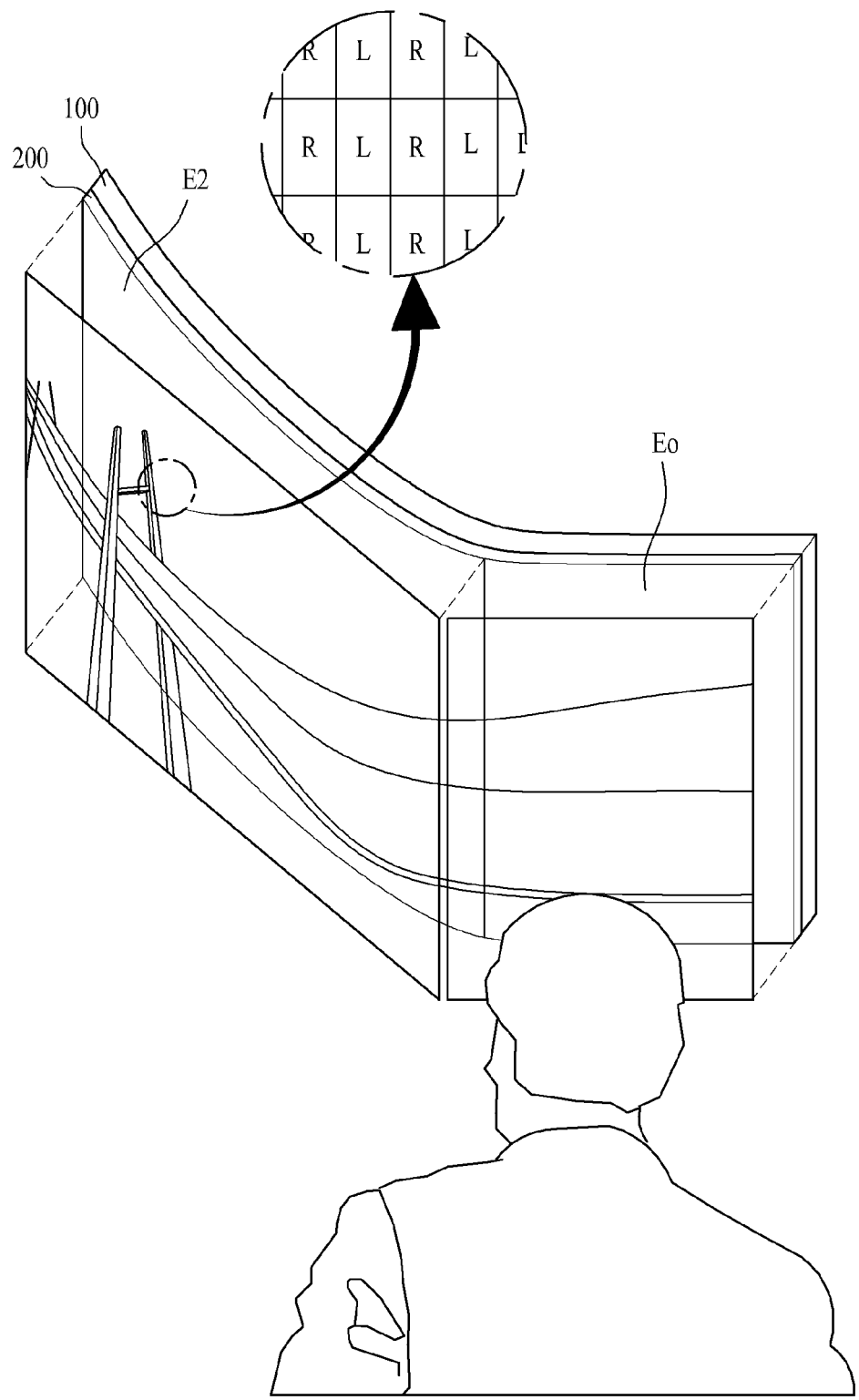

Referring to FIG. 19, when a right region E2 adjacent to a right side of a preset region E0 is flexed backward with reference to the preset region E0 located in the very front of a user, the flexible display unit 100 is controlled in a manner that a brightness of a left pixel PL of the right region E2 is smaller than that of a right eye pixel PR.

If the right region E2 is flexed backward, the right region E2 is located closer to a user's right eye than a user's left eye, Hence, if the brightness of the left pixel PL of the right region E2 is decreased to be lower than that of the right eye pixel PL to reflect an actual position relation between the flexible display unit 100 and the user, it can provide the user with a more realistic 3D stereoscopic image.

In the above-mentioned situation, the control unit also controls a color sense of the left eye pixel PL of the right region E2 to become smaller than that of the right eye pixel PR. Hence, if the color sense of the right pixel PR of the right region E2 located more distant from the user's left eye than the user's right eye is decreased lower than that of the left eye pixel PL, it can enhance a 3D effect of the 3D stereoscopic image provided to the user.

Figure 20:
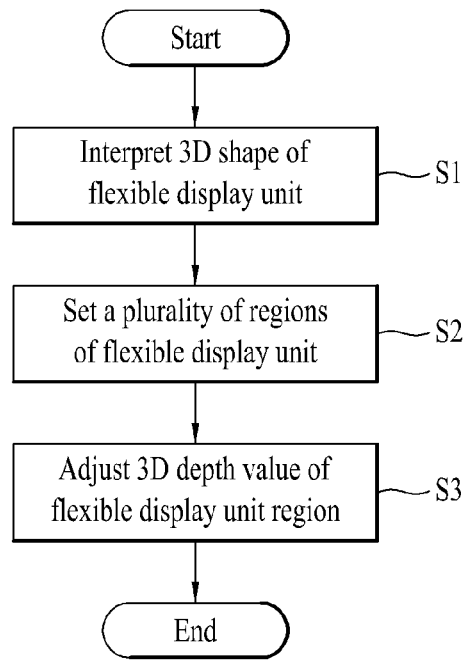
FIG. 20 is a flowchart of a method of adjusting a 3D image in a display apparatus according to one embodiment of the present invention.

Next, FIG. 20 is a flowchart of a method of adjusting a 3D image in a display apparatus according to one embodiment of the present invention. Referring to FIG. 20, a 3D shape of the flexible display unit 100 is interpreted (S21).

In particular, the 3D shape of the flexible display unit 100, as shown in FIG. 5, is interpreted using an electrical variation of the transparent sensor unit 200. If the flexible display unit 100 is flexed, the transparent sensor unit 200 provided to one face of the flexible display unit 100 is flexed together with the flexible display unit 100. In doing so, since an inner distance of the sensor electrode 230 of the transparent sensor unit 200 varies, a capacitance of the corresponding sensor electrode 230 varies as well. Hence, by calculating a flex extent and a flexed region of the flexible display unit 100 based on total capacitance variations of a plurality of the sensor electrodes 230, it can interpret the 3D shape of the flexible display unit 100.

Subsequently, the flexible display unit 100 is partitioned into a plurality of regions based on the 3D shape of the flexible display unit 100 and a corresponding 3D depth value is then adjusted (S2, S3). For example, referring to FIGS. 7 and 8, the control unit can adjust the 3D depth values by decreasing a 3D depth value DB of a flexible display unit region EB flexed convexly forward and increasing a 3D depth value DA of a flexible display unit region EA flexed concavely backward. By adjusting the 3D depth values of the flexible display unit 100 in the above-described manner, even if the flexible display unit 100 is flexed, the control unit can implement the same 3D stereoscopic image of the flexible display unit 100 in the planar state.

In particular, for the forward convexly flexed flexible display unit EB, a 3D stereoscopic image is relatively viewed as if projected convexly or elongated. As a result, the 3D depth value of the convexly flexed flexible display unit region EB is decreased to become lower than a 3D depth value of a normal state, thereby canceling out the convexly projected view effect according to the flex of the flexible display unit 100. Also, for the backward concavely flexed flexible display unit EA, a 3D stereoscopic image is relatively viewed as if recessed. As a result, the 3D depth value DA of the concavely flexed flexible display unit region EA is increased to be higher than a 3D depth value of a normal state, thereby canceling out the recessed view effect according to the flex of the flexible display unit 100.

In another example, referring to FIG. 11, when the flexible display unit 100 is concavely flexed to surround a user, with reference to the preset region E0 located in the very front of a user, a 3D depth values D1/D2 of the left/right region E1/E2 adjacent to the left/right side of the preset region E0 may be raised greater than a 3D depth value D0 of the preset region E0. Hence, the user can sense a 3D stereoscopic effect as if situated within the 3D stereoscopic image.

In particular, as the 3D depth values D1/D2 of the left/right region E1/E2 is adjusted greater than the 3D depth value D0 of the preset region E0, in viewpoint of a user, a 3D stereoscopic image displayed on the left region E1 located at a right side of the user or a 3D stereoscopic image displayed on the right region E2 located at a left side of the user may look projected further than a 3D stereoscopic image displayed on the preset region E0 located in the very front of the user. Since the flexible display unit 100 is flexed concavely to surround the user to give a sense of an inner space and the 3D stereoscopic images on the left and right sides of the user look further projected, the user can sense a 3D stereoscopic effect as if situated within the 3D stereoscopic image.

In doing so, referring to FIG. 12, the left region E1 and the right region E2 of the concavely flexed flexible display unit 100 may be subdivided into a plurality of $1^{st}$ unit regions E1a, E1b, E1c and E1d and a plurality of $2^{nd}$ unit regions E2a, E2b, E2c and E2d, respectively. The flexible display unit 100 may be controlled to have the 3D depth value of each of a plurality of the $1^{st}$ unit regions E1a, E1b, E1c and E1d in a manner that the 3D depth value of the unit region located at the left side is greater than that of the unit region located at the right side. Further, the flexible display unit 100 may be controlled to have the 3D depth value of each of a plurality of the $2^{nd}$ unit regions E2a, E2b, E2c and E2d in a manner that the 3D depth value of the unit region located at the right side is greater than that of the unit region located at the left side.

In particular, each of the left region E1 and the right region E2 is subdivided into a plurality of the unit regions and the 3D depth values are increasingly and sequentially raised in user-located direction to represent depth perception of the 3D stereoscopic image in further detail, thereby further enhancing a 3D stereoscopic effect sensed by a user as if situated within the 3D stereoscopic image.

Accordingly, the present invention provides the following effects and/or advantages.

First of all, the present invention increases or decreases a 3D depth value of a region, in which a flexible display unit is flexed, by interpreting a 3D shape of the flexible display unit, thereby implementing the same 3D image of the flexible display unit in a planar state despite that the 3D shape of the flexible display unit is changed and preventing a 3D effect from being degraded.

Secondly, when a flexible display unit is concavely flexed to surround a user, the present invention sequentially increases a 3D depth value in a user-located direction by partitioning the flexible display unit into a plurality of regions.

Thirdly, the present invention individually adjusts a color sense and brightness of a left eye pixel and a color sense and brightness of a right eye pixel in a flexible display in accordance with a flexed direction of the flexible display, thereby enhancing a 3D effect of a display apparatus.

Fourthly, when the flexible display including the 3D stereoscopic image technology applied thereto is flexed, the display does not identically maintain a 3D image in a planar state. Therefore, a 3D stereoscopic image is not degraded due to a variation of an originally intended 3D depth value of the 3D stereoscopic image.

The aforementioned embodiments of the mobile terminal may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus, comprising:
a flexible display unit configured to discriminately output a left eye image and a right eye image;
a transparent sensor unit disposed on one face of the flexible display unit and configured to be flexed together with the flexible display unit; and
a control unit configured to receive a signal from the transparent sensor unit corresponding to an electrical variation generated in accordance with a flex direction and
a flex extent of the flexible display unit, and to adjust a 3D depth value of a flexed region of the flexible display unit in accordance with the signal,
wherein the control unit is further configured to adjust the 3D depth value by decreasing the 3D depth value of a forward convexly flexed region of the flexible display unit and
increasing the 3D depth value of a backward concavely flexed region of the flexible display unit.

2. The display apparatus of claim 1, wherein the transparent sensor unit comprises a transparent substrate, a plurality of sensor electrodes disposed on the transparent substrate, and an electrode line connected to one or both ends of each of a plurality of the sensor electrodes, and
wherein the control unit is further configured to interpret a 3D shape of the flexible display unit based on an inner distance variation of each of the sensor electrodes in accordance with the flex of the flexible display unit.

3. The display apparatus of claim 1, wherein the control unit is further configured to subdivide the flexible display unit into a plurality of regions and to individually adjust the 3D depth value of each region.

4. The display apparatus of claim 3, wherein the received signal indicates the flexible display unit is flexed in a first region forward more than a preset region of the flexible display unit, and is flexed in a second region adjacent to the preset region backward more than the preset region, and
wherein the control unit is further configured to set the 3D depth value of the first region to be greater than the 3D depth value of the preset region and to set the 3D depth value of the second region to be smaller than the 3D depth value of the preset region.

5. The display apparatus of claim 4, wherein the controller is further configured to subdivide the first region into a plurality of first regions and the second region into a plurality of second regions, to increasingly raise the 3D depth value of each of the plurality of first regions in proportion to an increasing distance from the preset region, and to decreasingly lower the 3D depth value of each of the plurality of second regions in proportion to the increasing distance from the preset region.

6. The display apparatus of claim 3, wherein the flexible display unit comprises a plurality of unit pixels, each including a left eye pixel and a right eye pixel.

7. The display apparatus of claim 6, wherein the control unit is further configured to individually adjust a color sense and brightness of the left and right eye pixels in accordance with an interpreted 3D shape of the flexible display unit.

8. The display apparatus of claim 7, wherein if a first region adjacent to a left side of the preset region is flexed forward with reference to the preset region located directly in front of a user, the control unit is further configured to set the brightness of the right eye pixel of the first region to be greater than the brightness of the left eye pixel, and
wherein if the left region is flexed backward, the control unit is further configured to set the brightness of the right eye pixel of the left region to be smaller than the brightness of the left eye pixel.

9. The display apparatus of claim 8, wherein if a second region adjacent to a right side of the preset region is flexed forward with reference to the preset region located directly in front of a user, the control unit is further configured to set the brightness of the left eye pixel of the second region to be greater than the brightness of the right eye pixel, and
wherein if the right region is flexed backward, the control unit is further configured to set the brightness of the left eye pixel of the right region to be smaller than the brightness of the right eye pixel.

10. The display apparatus of claim 7, wherein if a first region adjacent to a left side of the preset region is flexed forward with reference to the preset region located directly in front of a user, the control unit is further configured to set the color sense of the right eye pixel of the first region to be greater than the color sense of the left eye pixel, and
wherein if the left region is flexed backward, the control unit is further configured to set the color sense of the right eye pixel of the left region to be smaller than the color sense of the left eye pixel.

11. The display apparatus of claim 10, wherein if a second region adjacent to a right side of the preset region is flexed forward with reference to the preset region located directly in front of a user, the control unit is further configured to set the color sense of the left eye pixel of the second region to be greater than the color sense of the right eye pixel, and
wherein if the right region is flexed backward, the control unit is further configured to set the color sense of the left eye pixel of the right region to be smaller than the color sense of the right eye pixel.

12. The display apparatus of claim 1, further comprising:
a parallax barrier provided between the flexible display unit and the transparent sensor unit,
wherein the parallax barrier includes:
a plurality of cutoff parts configured to selectively cut off the left eye image or the right eye image output from the flexible display unit; and
a plurality of transmittive parts configured to selectively transmit the left eye image or the right eye image.

13. The display apparatus of claim 1, further comprising:
a lenticular lens disposed between the flexible display unit and the transparent sensor unit, the lenticular lens configured to selectively refract the left eye image or the right eye image output from the flexible display unit by a different refraction index.

14. A method of controlling a display apparatus, the method comprising:
discriminately outputting, via a flexible display unit of the display apparatus, a left eye image and a right eye image;
sensing, via a transparent sensor unit disposed on one face of the flexible display unit, a flexing of the flexible display unit;
receiving, via a control unit, a signal from the transparent sensor unit corresponding to an electrical variation generated in accordance with a flex direction and a flex extent of the flexible display unit; and
adjusting, via the control unit, a 3D depth value of a flexed region of the flexible display unit in accordance with the signal,
wherein the adjusting step adjusts the 3D depth value by decreasing the 3D depth value of a forward convexly flexed region of the flexible display unit and increasing the 3D depth value of a backward concavely flexed region of the flexible display unit.

15. The method of claim 14, further comprising:
subdividing the flexible display unit into a plurality of regions; and
individually adjusting the 3D depth value of each region.

16. The method of claim 15, wherein the received signal indicates the flexible display unit is flexed in a first region forward more than a preset region of the flexible display unit, and is flexed in a second region adjacent to the preset region backward more than the preset region, and
wherein the method further comprises setting the 3D depth value of the first region to be greater than the 3D depth value of the preset region and setting the 3D depth value of the second region to be smaller than the 3D depth value of the preset region.

17. The method of claim 16, further comprising:
subdividing the first region into a plurality of first regions and the second region into a plurality of second regions;
increasingly raising the 3D depth value of each of the plurality of first regions in proportion to an increasing distance from the preset region; and
decreasingly lowering the 3D depth value of each of the plurality of second regions in proportion to the increasing distance from the preset region.

18. The method of claim 14, wherein the flexible display unit comprises a plurality of unit pixels, each including a left eye pixel and a right eye pixel, and wherein the method further comprises individually adjusting a color sense and brightness of the left and right eye pixels in accordance with a 3D shape of the flexible display unit.

* * * * *